United States Patent
Lepore et al.

(10) Patent No.: US 10,230,703 B1
(45) Date of Patent: Mar. 12, 2019

(54) PROVIDING MULTIPLE LEVELS OF GROUP ACCESS TO PARTIAL DATA OBJECTS

(71) Applicant: Cisco Technology, Inc., San Jose, CA (US)

(72) Inventors: Michael P. Lepore, Marlborough, MA (US); Scot DeDeo, Belmont, MA (US); Carl M. Phillips, Groton, MA (US); Andrew Biggs, Thorton, CO (US); Matthew A. Miller, Thornton, CO (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 15/335,928

(22) Filed: Oct. 27, 2016

(51) Int. Cl.
*H04L 9/32* (2006.01)
*H04L 29/06* (2006.01)
*G06F 12/14* (2006.01)

(52) U.S. Cl.
CPC ........ *H04L 63/061* (2013.01); *G06F 12/1408* (2013.01); *H04L 9/3242* (2013.01); *G06F 2212/1052* (2013.01)

(58) Field of Classification Search
CPC . H04L 63/061; H04L 9/3242; G06F 12/1408; G06F 2212/1052
USPC ........................................................ 713/171
See application file for complete search history.

(56) References Cited

U.S. PATENT DOCUMENTS

| | | |
|---|---|---|
| 6,301,658 B1 | 10/2001 | Koehler |
| 7,673,004 B1 | 3/2010 | Sherstinsky et al. |
| 8,379,857 B1 | 2/2013 | Zheng |
| 8,660,964 B2 | 2/2014 | Clark et al. |
| 8,831,224 B2 | 9/2014 | Bai et al. |
| 9,202,074 B1 * | 12/2015 | Bennett ................ G06F 21/602 |
| 2002/0044658 A1 | 4/2002 | Wasilewski et al. |
| 2006/0053302 A1 * | 3/2006 | Yasaki .................. H04L 9/0822 |
| | | 713/183 |
| 2010/0191983 A1 | 7/2010 | Yami et al. |
| 2013/0262863 A1 | 10/2013 | Yoshino et al. |
| 2013/0339722 A1 | 12/2013 | Krendelev et al. |
| 2015/0256338 A1 | 9/2015 | Roberts |
| 2015/0281184 A1 | 10/2015 | Cooley |
| 2015/0281185 A1 | 10/2015 | Cooley |
| 2017/0039397 A1 * | 2/2017 | Furuhashi ............... G06F 21/78 |

OTHER PUBLICATIONS

D. McGrew et al., "Encrypted Key Transport for Secure RTP", draft-ietf-avtcore-srtp-ekt-00, AVT Working Group, Internet-Draft, Jul. 9, 2012, 51 pages.

(Continued)

*Primary Examiner* — Mohammad W Reza
(74) *Attorney, Agent, or Firm* — Edell, Shapiro & Finnan, LLC

(57) ABSTRACT

A first data item is encrypted at a client device using a first encryption key. The encrypted first data item is included in a data object. A second encryption key is received at the client device from a key management device. The first encryption key is encrypted using the second encryption key. The encrypted first encryption key is included in the data object, and the data object is stored at a storage device.

20 Claims, 18 Drawing Sheets

(56) References Cited

OTHER PUBLICATIONS

Perspecsys, "Cloud Data Encryption Primer-Cloud Data Encryption and SaaS Security", retrieved from http://perspecsys.com/resources/cloud-encryption-primer/, on Jan. 24, 2014, pp. 1-6.

Mit Kerberos Consortium, "The Role of Kerberos in Modern Information Systems," retrieved from www.kerberos.org/software/rolekerberos.pdf, on Mar. 26, 2014, pp. 1-53.

Z.N. Dayioğlu, et al., "Secure Database in Cloud Computing: CryptDB Revisited", International journal of Information Security Science, vol. 3, No. 1, 2014, 19 pages.

Rick Nelson, "Onions of encryption boost big-data security", Evaluation Engineering, Rick's Blog, Feb. 27, 2015, http://www.evaluationengineering.com/onions-of-encryption-boost-big-data-security, 2 pages.

A. Biggs, et al., "Key Management Service Architecture", draft-abiggs-saag-key-management-service-00, Network Working Group, Internet-Draft, Nov. 17, 2014, 49 pages.

J. Mattsson, et al., "MIKEY-TICKET: Ticket-Based Modes of Key Distribution in Multimedia Internet KEYing (MIKEY)", Internet Engineering Task Force (IETF), Mar. 2011, 58 pages.

\* cited by examiner

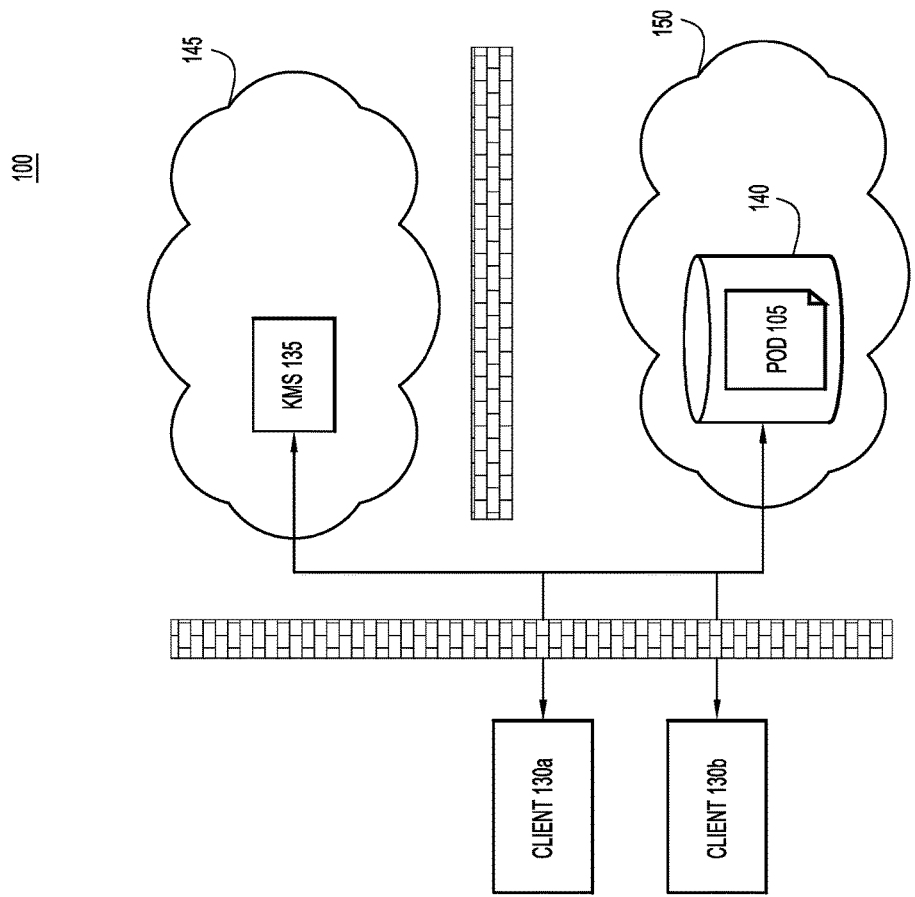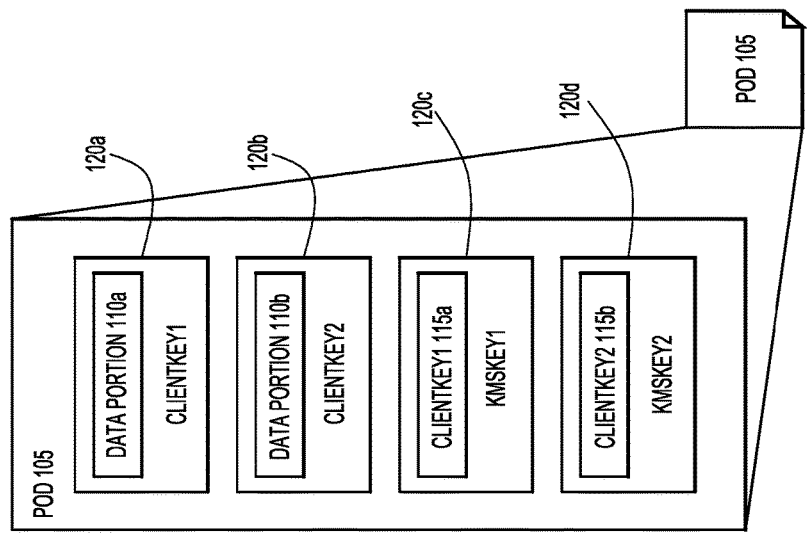
FIG.1

```
{
  "id" : "7288db10-5886-4f3a-a816-c5860a82b229",
  "fieldsets":[
    "InsuranceCustomer":[
    ],
    "dataElements":[
      {"level":"GOLD", "type":"string"}
    ],
    encryptedData: "eyJhbGciOiJBMTI4S1ciLCJlbmMiOiJBMTI4Q0JDLUhTMjU2In0.9wejwhePSqB_wvRbe8NLgKQ6LKkP8Ls43
    vOu4Nm-1jjCNdHjS-ZOmQ.A\YNNyB9f5jbhq
    39QM-zDw.ao7VQluT8q8-GUQ8djnuF'PHXgf0QjB20UJZB7QNEFM-CZKBjjfhRRjjeyGZKPHQW_nFUVDFHgBRKwXQZ6UGtSaunyIkWlgA-9dH-SGzd2dPD5h-TqNF0QHAu_HyGawTMx1
    pCANZAzgeOoqsdkGcYs9dzaYoxlzhNpFzhaREdbyTmTSTRkowtPQhF-6DmCpMS2JJoY6Kpg5GgE_oz2yvr2g9HMaohVQFjPIn
    jFkIFErcUcV_-XAiddhDHcwy5-Q_RgpV9rrOXzQxwSNcaJEb2kJCCvcvriCibF6zZZMeQGEpQ3yjHW6cbtSfrXJsBSYd7Omw16rASFnk5IhtizMIUFM9RbEjz5hOoQWss9QEkGwwwALOqZIeIk6RPvZE
    FQy8y36BquMwbgA01Hslb6IfapxrUgZBd3IHuGi7YXpNgchpCgggR22NJSF8cH4bj4LuchV1Zr5LPPTG1af41zeecgji9PFzgvZe3fSIF0k7yqNEPZ6m17t
    D8ZYKtg45HAZOSMN-pbm9yR17tKQyYv1rTByCkHwRO3FGuiezvw12wnesZAe4g32UZWIuGSuX96TOh5XapjP876qPoPa8fI26sV4pGqEh4S4xfSTZh
    c5k8ZV90hHFectwTC0FsPgoyoYjrcv5Jm-I8uLxOuNz6HLI_qSbnkt9_Bx5G5wf1EXxpuADabeVq0TOMX5QQ5GNssvf2I365IxuvugFXPC2wRg",
    "piiData" : eyJhbGciOieeyJhbGciOiJBMTFXPC2wRgJhbGciOiJBMTFXyJhbGciOiJBMTFXPC2wRgJhbGciOiJBMTFXPC2eyJhbGciOiJBMTFXPC
    2wRgJhbGciOiJBMTFXwRgJhbGciOiJBMTFX",
    "workgroups" : {
      "https://<host>/workgroups/wg1": [
        {"keyId":"d2c949c1-9395-4b9e-ba9b-a7d8fb84ace5","PiiSCR":"<PII-SCR>"},
        {"keyId": "d2c949c1-9395-4b9e-ba9b-a7d8fb84ace5","encryptedSCR":"<EncryptedData-SCR>"}
      ],
      "https://<host>/workgroups/wg2": [],
      "https://<host>/workgroups/wg3": [
        {"keyId":"d2c949c1-9395-4b9e-ba9b-bb2134ace6f7","encryptedSCR":"<EncryptedData-SCR>"}
      ]
    }
  }
}
```

205

206 — "fieldsets"
210a — "dataElements"
210b — encryptedData
210c — "piiData"
220 — "workgroups"
225a, 225b, 225c

FIG.2

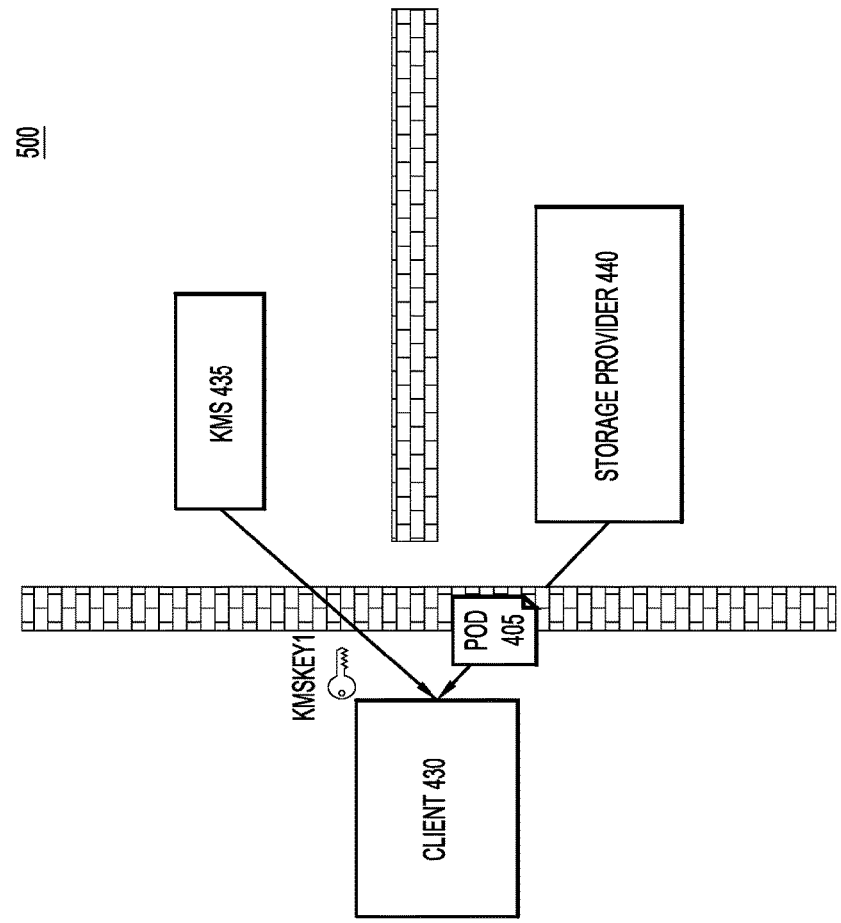
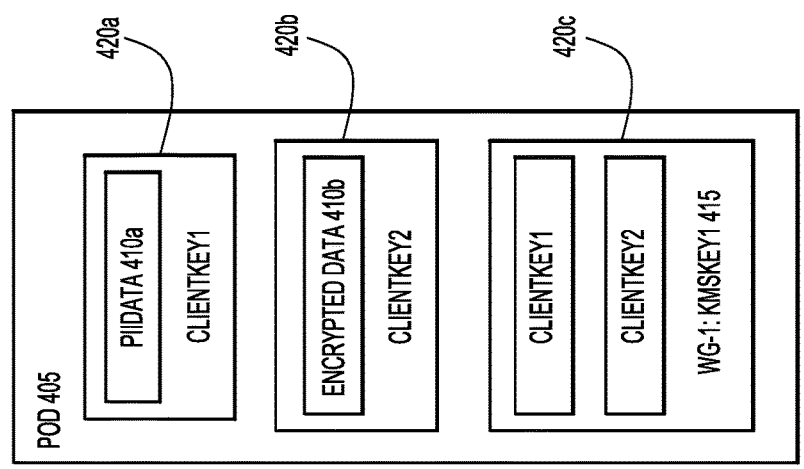
FIG.8

```
1505

{
"id" : "7288db10-5886-4f3a-a816-c5860a82b229",
"fieldsets":[
"insuranceCustomer" :[

"dataElements":[
{"level":"GOLD", "type":"string"}
],
       ┌ "piiData" : eyJhbGciOieeyJhbGciOiJBMTFXPC2wRgJhbGciOiJBMTFXyJhbGciOiJBMTFXPC2wRgJhbGciOiJBMTFXJBMTFXPC2wRgJhbGciOiJBMTFXJBMTFXPC2eyJhbGciOiJBMTFXPC
1510 ┤   2wRgJhbGciOiJBMTFXwRgJhbGciOiJBMTFX",
       └ "piiHashes":[
       ┌ "b35073808l9d21f14a4cc8fe20fd977d648ba5f08461d1c004d2588l454479cd",
1560 ┤
       └ "6c22cdc4243014fd1d1185eede08e9b483757af58655aa8dee9ade13797d53l40"
]
}
], "workgroups" : {
"https://<host>/workgroups/wg1": [
{"keyId":"d2c949c1-9395-4b9e-ba9b-a7d8fb84ace5","encryptedSCR":"<PII-SCR>"},
{"keyId:" d2c949c1-9395-4b9e-ba9b-bb2134ace6f7" ,"encryptedSCR":"<EncryptedData-SCR>"}
],
"https://<host>/workgroups/wg2": [],
"https://<host>/workgroups/wg3": [
{"keyId":"d2c949c1-9395-4b9e-ba9b-bb2134ace6f7","encryptedSCR":"EncryptedData-SCR>"},
]
}
}
```

1705 — TRANSMITTING A DATA OBJECT FROM A CLIENT DEVICE TO A STORAGE DEVICE FOR STORAGE AT THE STORAGE DEVICE, WHEREIN THE DATA OBJECT CONTAINS AN ENCRYPTED DATA ITEM

1710 — RECEIVING, AT THE CLIENT DEVICE, A SALT VALUE FROM A KEY MANAGEMENT DEVICE

1715 — GENERATING, USING THE SALT VALUE, A HASH VALUE FOR THE UNENCRYPTED DATA CONTAINED IN THE ENCRYPTED DATA ITEM

1720 — TRANSMITTING THE HASH VALUE TO THE STORAGE DEVICE TO BE INCLUDED IN AN INDEX STORED AT THE STORAGE DEVICE, WHEREIN THE HASH VALUE WILL BE INCLUDED AS AN INDEX VALUE ASSOCIATED WITH THE ENCRYPTED DATA ITEM AT THE STORAGE DEVICE

PROVIDING MULTIPLE LEVELS OF GROUP ACCESS TO PARTIAL DATA OBJECTS

TECHNICAL FIELD

The present disclosure relates to data access, data storage, and data encryption.

BACKGROUND

A data object or data structure is a particular way of storing and organizing data in a device so that it can be used efficiently. Data objects may include data records, such as database records. Accordingly, data objects may include multiple data fields. Depending on the sensitivity of the data, different portions of a single data object may require different levels of security. For example, a data object containing data identifying an employee may have public information, such as information identifying an employee's department within an organization, and sensitive or confidential information, such as the employee's name, social security number and/or salary.

A system that uses one or more key management servers (KMSs) is useful to provide an integrated approach for generating, distributing and managing cryptographic keys for devices and applications. A KMS may be used for all aspects of security—including the secure generation of keys, the secure exchange of keys, and the secure storage of keys. Thus, a KMS provides the backend functionality for key generation, distribution, and replacement.

BRIEF DESCRIPTION OF THE DRAWINGS

FIG. 1 is block diagram of a network environment configured to provide multiple levels of group access to partial data objects, according to an example embodiment.

FIG. 2 illustrates a data object configured to provide multiple levels of group access to partial data objects, according to an example embodiment.

FIGS. 8-10 are a series of block diagrams of a network environment illustrating operations that access the contents of a data object configured to provide multiple levels of group access to partial data objects, according to an example embodiment.

FIG. 15 illustrates a data object configured to provide multiple levels of group access to partial data objects that also includes hash values that will provide for the searching of the data contained in the data object, according to an example embodiment.

FIG. 17 is a flowchart illustrating a process for providing hash values that allow for the searching of data objects configured to provide multiple levels of group access to partial data objects, according to an example embodiment.

DESCRIPTION OF EXAMPLE EMBODIMENTS

Overview

Figure 3:
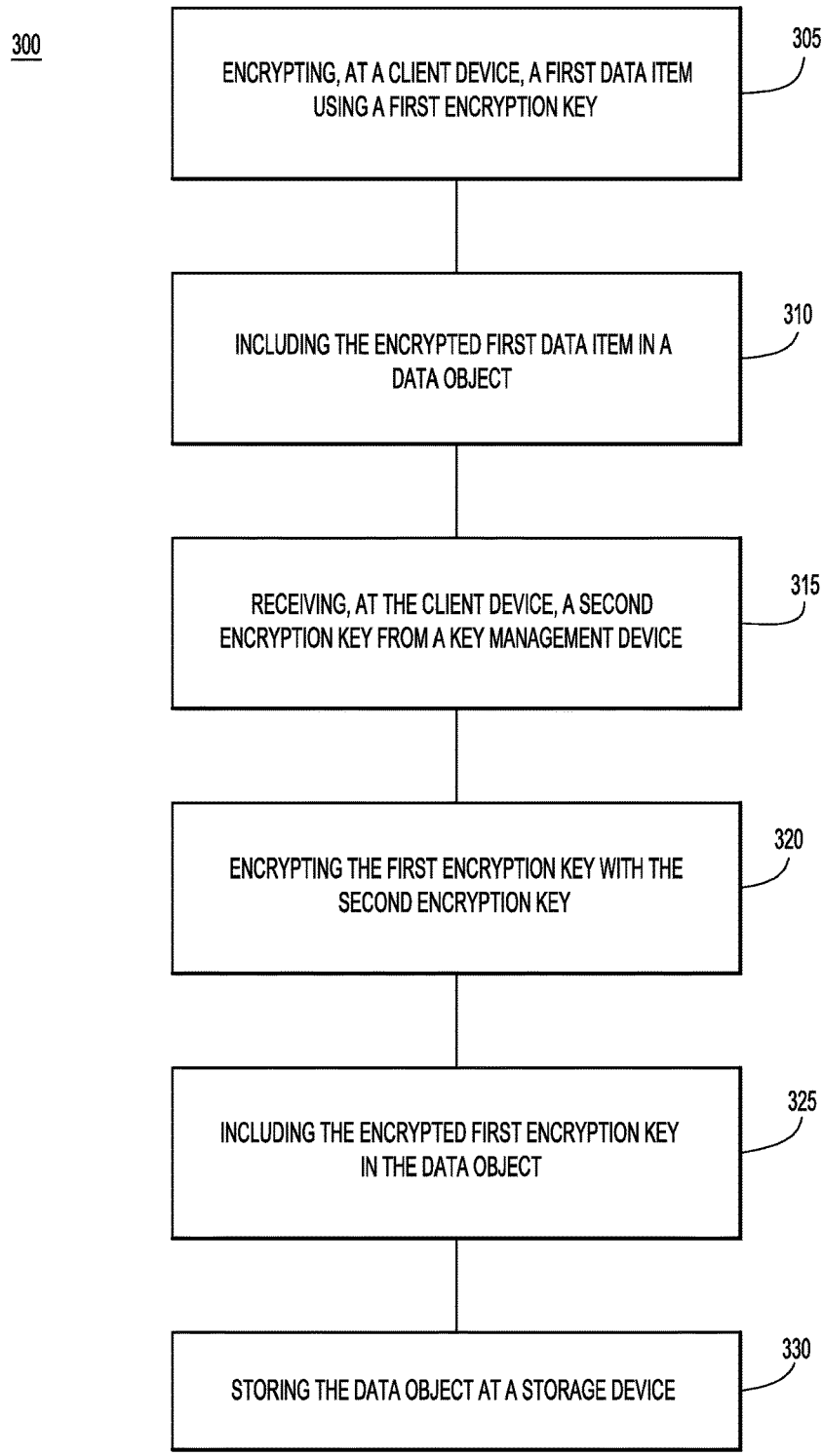
FIG. 3 is a flowchart illustrating a process for providing multiple levels of group access to partial data objects, according to an example embodiment.

According to example embodiments, a first data item is encrypted at a client device using a first encryption key. The encrypted first data item is included in a data object. A second encryption key is received at the client device from a key management device. The first encryption key is encrypted using the second encryption key. The encrypted first encryption key is included in the data object, and the data object is stored at a storage device.

According to further example embodiments, a second data item may be encrypted at the client device using a third encryption key. The second data item may also be included in the same data object as the first data item. The third encryption key is encrypted using a fourth encryption key. The encrypted third encryption key is included in the data object.

Example Embodiments

Depicted in FIG. 1 is a network environment 100 that is configured to provide group-level encryption to different parts of a single data object in order to provide multiple levels of group access to partial data objects. Included in network environment 100 are client devices 130*a* and 130*b*, key management server (KMS) 135, and storage device 140. Client devices 130*a* and 130*b* are the creators and consumers of data objects or "Pieces of Data" (POD) 105. KMS 135 distributes and manages security keys that are used to encrypt data and communications within network environment 100, and storage device 140 provides storage for data, including data objects 105. KMS 135 may be one device within a cloud provider of security services 145, and storage device 140 may be one device within a cloud provider of storage services 150.

According to the techniques described herein, different portions of data object 105 are encrypted such that different user groups are provided with different levels of access to different portions of data object 105. Specifically, network environment 100 utilizes two-stage encryption applied to data object 105 such that different groups have different levels of access to the content of data object 105.

As illustrated in FIG. 1, data object 105 includes both data portions 110*a* and 110*b*, and key portions 115*a* and 115*b*. Data portions 110*a* and 110*b* include the data that is being stored for subsequent consumption and/or modification by users of the object. First data portion 110*a* is encrypted with a first client key, as illustrated through encryption 120*a*. Specifically, encryption 120*a* is performed by a first client key, "ClientKey1." This key is referred to as a "client key"

because it is generated by the device, such as client 130*a* or 130*b* that creates data object 105. Similarly, data portion 110*b* is encrypted, as illustrated through encryption 120*b*, using a second client key, "ClientKey2." The first and second client keys are, in turn, encrypted and stored in encryption key portions 115*a* and 115*b*, respectively. Encryption key portions 115*a* and 115*b* are encrypted through first and second key management server keys, "KMSKey1" and KMSKey2," respectively, as illustrated through encryption 120*c* and 120*d*, respectively. Key management server keys are received from key management server 135. The first and second key management server keys "KMSKey1" and KMSKey2" are themselves not included in data object 105.

In other words, data object 105 is constructed from a number of different entries, encrypted portions 120*a-d*. These encrypted portions include data portions 110*a* and 110*b*, and key portions 115*a* and 115*b*. Each of encrypted data portions 110*a* and 110*b* includes data that is to be accessed by a particular user group (i.e., "workgroup") as determined by the client device creating data object 105. Data portions 110*a* and 110*b* are then encrypted using a local key (i.e., "ClientKey1" and/or "ClientKey2") that is specific to the workgroup that is permitted to access data portions 110*a* and/or 110*b*. In order to allow the determined workgroups to access data portions 110*a* and/or 110*b*, corresponding entries (i.e., key portions 115*a* and 115*b*) are created in data object 105 into which the local keys are embedded. Finally, the key portions 115*a* and 115*b* are encrypted with external keys (e.g., "KMSKey1" and/or "KMSKey2") that are only accessible by the data groups determined by the client device as appropriate to access a particular data portion 110*a* and/or 110*b*. Accordingly, data object 105 includes two-stage encryption:

1. A first stage in which data to be stored in data object 105 is encrypted using client encryption keys; and
2. A second stage in which the client encryption keys used to encrypt the data in the first stage are included in the data object and encrypted using external encryption keys that are not stored in the data object.

Through these two stages or levels of encryption, data object 105 can provide different encryption to different elements within the same data object, while simultaneously ensuring that the data object remains securely encrypted to outside or third party service providers, such as service providers of KMS 135 and/or data storage device 140.

For example, KMS 135 may be configured to provide "KMSKey1" to a first group of users. Accordingly, using KMSKey 1 this first group will be able to decrypt encryption 120*c* to acquire "ClientKey1" from encryption key portion 115*a*. Once "ClientKey1" is recovered, the first group members are then capable of decrypting encryption portion 120*a* to access the contents of data portion 110*a*. On the other hand, a second group of users may be provided with "KMSKey2," which allows this second group to decrypt encryption 120*d* to acquire "ClientKey2" from encryption key portion 115*b*. Once "ClientKey2" is recovered, the second group members are then capable of decrypting encryption portion 120*b* to access the contents of data portion 110*b*. Furthermore, users who belong to the first group, but not to the second group will not be able to access the data in data portion 110*b* because they will not be provided with "KMSKey2." Similarly, users who belong to the second group, but not the first group, will not be able to access the data in data portion 110*a* because they will not be provided with "KMSKey1." Users who belong to both the first group and the second group will be able to access both data portion 110*a* and 110*b*, as these users will have access to both "KMSKey1" and "KMSKey2."

In others words, the network environment described in FIG. 1 provides workgroup level access control and multiple level access control of data contained in a data object. Because the access control is provided directly in the data object through the embedded client keys (e.g., "ClientKey1" and/or "ClientKey2"), the access control remains in place across the entire system, from the creation of the data object at a client device, such as client devices 130*a* and 130*b*, the storage of the data object at storage device 140, and then a subsequent accessing of the data object from storage device 140 via client devices 130*a* and 130*b*. Furthermore, because the encryption is incorporated into the data object itself along with the encryption keys that allow the data to be decrypted (e.g., "ClientKey1" and "ClientKey2"), the data encryption and management may be applied at the application level. Therefore, a system like that illustrated in FIG. 1 utilizes embedded keys (e.g., "ClientKey1" and "ClientKey2") and external or cloud-stored keys (e.g., "KMSKey1" and "KMSKey2") to provide selective workgroup level access to data in a record in an end-to-end encrypted format.

Additionally, data objects generated according to the techniques described here may remain secure to the service providers used to store the data objects and/or KMS 135. Storage device 140 will not be granted access to "KMSKey1" and/or "KMSKey2" by KMS 135, and therefore, storage service provider 150 will not able to access the data contained in data object 105 even when data object 105 is stored with the storage service provider 150 at storage device 140. Similarly, even though KMS 135 may have access to "KMSKey1" and "KMSKey2," KMS 135 will not have access to data object 105. Therefore, the data contained in data object 105 is protected from both third party service providers, and only accessible by clients 130*a* and 130*b*.

Furthermore, because the embedded keys (e.g., "ClientKey1" and "ClientKey2") are included in the data object, these keys may be specific to a particular data object, with new keys created for every data object. The embedded keys may be also used for multiple data objects, rotated on a periodic basis, and/or changed on a per application basis. The external keys may be rotated on a periodic basis.

Finally, though not illustrated in FIG. 1, data object 105 may also include plain text data portions that are accessible by all user groups. More generally, data object 105 may be configured with multiple levels of access, with different levels of access provided to different workgroups. For example, data object 105 includes two levels of encrypted data. Data object 205 of FIG. 2 (to be described in more detail below) includes three levels of access—plain text data accessible by everyone and two levels of encrypted data accessible by different workgroups. Other example embodiments may include different numbers of levels of encrypted data with or without plain text data portions.

With reference now made to FIG. 2, depicted therein is an exemplary data object 205 that is configured to provide multiple levels of access to data stored within the same data object. Accordingly, data object 205 contains identifying information 206 that indicates the identifying information for data object 205, including an identification number for the data object. Data object 205 then includes a number of data fields 210*a-c*. As will be described in further detail below, data fields 210*a-c* correspond to portions 120*a* and 120*b* of data object 105 of FIG. 1.

Specifically, data portion 210*a* is plain text data, and therefore, the content of the "dataElements" data is visible without the need for any decryption. Data portion 210*b* includes data entitled "encryptedData" that is encrypted using a first embedded encryption key, which will be described below with reference to workgroup portion 220. Data portion 210c includes data entitled "piiData" that is encrypted using a second encryption key which will also be described below with reference to workgroup portion 220. Accordingly, data portion 210b is analogous to encrypted portion 110a of FIG. 1, and data portion 210c is analogous to encrypted portion 110b of FIG. 1.

Workgroup portion 220 is analogous to key portions 115a and 115b of FIG. 1. Specifically, workgroup portion 220 includes three different workgroup definitions 225a-c. Each workgroup definition indicates a particular workgroup, identifies external keys used to encrypt embedded keys associated with the workgroup, and includes embedded keys that may be used to decrypt one or more of data portions 210a-c. Furthermore, workgroup definitions 225a-c include pointers to where the data encrypted with the embedded key is located. As such, workgroup definitions 225a-c may be embodied as Secure Content Resources (SCRs), i.e., structured portions of the data file 205 that contain encrypted encryption keys along with a pointer to where in the data file the data encrypted with that encryption key may be found.

According to the specific example of FIG. 2, workgroup definition 225a defines a workgroup "wg1," and identifies workgroup "wg1" using the following uniform resource locator:

"https://<host>/workgroups/wg1"

Workgroup definition 225a also includes an identifier of the key used to encrypt the embedded key for encrypted data 210b:

"keyId":"d2c949c1-9395-4b9e-ba9b-a7d8fb84ace5"

Workgroup definition 225a also includes the encrypted embedded key used to encrypt encrypted data 210b:

"encryptedSCR":"<EncryptedData-SCR>"

The value "EncryptedData-SCR" illustrated in FIG. 2 is shorthand for a JavaScript Object Notation (JSON) data structure containing the following data:

{
"enc":"A256GCM",
"key":"ZMpktzGq1g6_r4fKVdnx9OaYr4HjxPjIs717SwAsgsg",
"iv": "27YvzsYL6vphciqr",
"aad":"2014-08-15T12:59:59Z",
"loc":"pod.piiData",
"tag": "CbtrN5UY2m1LUtGtxSkTEw"
}

The "enc" value identifies the type of encryption applied by the key. The example above indicates that 256 bit Galois/Counter Mode encryption has been applied. The "key" value indicates the encryption key itself. The "iv" value provides an initialization vector value for the encryption. The "aad" value provides "Additional Authentication Data" for the encryption. The "loc" value indicates where within data structure 205 the encrypted data is located. Specifically, the "loc" tag included above would point to encrypted data portion 210b. Finally, the "tag" value contains data that allows for verification of the encrypted data upon decryption. In other words, the "tag" value provides data that may be used to determine whether or not the encrypted data was tampered with after encryption.

As described above, the "encryptedSCR":"<EncryptedData-SCR>" portion of workgroup definition 225a includes the embedded encryption key ("key": "ZMpktzGq1g6_r4fKVdnx9OaYr4HjxPjIs717SwAsgsg") as well as a pointer to where the data encrypted with that key may be located ("loc":"pod.piiData"). Therefore, the "encryptedSCR":"<EncryptedData-SCR>" portion of workgroup definition 225a may be considered a SCR.

According to the example of FIG. 2, workgroup "wg1" was provided with access to all of the encrypted data contained in data object 205. Therefore, workgroup definition 225a also includes an additional set of analogous embedded and external key values that may be used to decrypt encrypted data 210c. Specifically, workgroup definition 225a also includes an encryption key id and an SCR to access the "piiData" of encrypted data portion 210c.

Workgroup definition 225b defines a second workgroup, workgroup "wg2," which has not been granted permission to access any of the encrypted data contained in data portions 210a-c. Therefore, workgroup definition 225b does not contain any encryption key ids or SCRs.

Finally, workgroup definition 225c includes a workgroup definition for a third workgroup, workgroup "wg3." Workgroup "wg3" has been granted permission to access the data encrypted in data portion 210b, and therefore, only includes a single embedded encryption key. The copy of the "EncryptedData-SCR" key included in workgroup definition 225c is encrypted using an external encryption key different than the one used encrypt this same key (as well as the "PII-SCR" encryption key) in workgroup definition 225a.

By implementing a data object structure like that illustrated in data object 205 of FIG. 2, the same data object may be provided to members of all three workgroups, "wg1," "wg2" and "wg3." Using the two-stage encryption employed in data object 205, members of each workgroup will only be able access the encrypted data for which they were previously granted permission. Specifically, through its access to the appropriate external encryption keys, members of workgroup "wg1" are able to access the encrypted data in both the "encryptedData" data portion 210b and the "piiData" data portion 210c, as workgroup definition 225a includes both of the "PII-SCR" and "encryptedData-SCR" embedded encryption keys. Members of workgroup "wg2" will only be able to access plain text data portion 210a as there are no embedded encryption keys included in workgroup definition 225b. Finally, members of workgroup "wg3" are able to access the "EncryptedData-SCR" embedded encryption key, with which members of workgroup "wk3" may decrypt "encryptedData" 210b.

In addition to providing multiple levels of access to different workgroups, the structure of data object 205 allows members of each workgroup to edit/update the content of the data object. Furthermore, the members of the workgroups and/or data storage devices (e.g., storage device 140 of FIG. 1) may treat the data object as a Binary Large Object (BLOB). Accordingly, data object 205 may be treated as an opaque BLOB, permitting storage, updating and/or editing of the data without needed to explicitly understand the application-level nature of the encrypted data contained therein.

Relying on a client device to generate a data object like data object 205 of FIG. 2 (or data object 105 of FIG. 1) may add complexity to the client and to the user experience of the client. In order to simplify the logic and client experience, an additional feature of a "dictionary" may be provided. Such a dictionary may include definitions for each field that is stored in the system, i.e., the dictionary may include definitions for each data field used by the client system that could be included in a data object. These definitions may include the field name, along with the section of the data object that the data is stored in. When generating a data object, a client device may access the appropriate dictionary definition to simplify the process of generating a data object.

Edits/updates may be encrypted using the original client generated key, therefore someone granted access to only a section of the data does not need to change the KMS associations or the workgroup fields for any workgroup which they are not a part of when editing or updating the data contained in the data object. Client keys are only created at creation of the object, or when the object is associated with a new workgroup.

With reference now made to FIG. 3, depicted therein is a flowchart 300 illustrating a process for providing multiple levels of access to data stored within the same data object.

Flowchart 300 begins with operation 305 in which a first data item is encrypted at a client device using a first encryption key. For example, the encryption of operation 305 may be analogous to the encryption of data portion 110a using "ClientKey1," as described above with reference to FIG. 1. Accordingly the encryption key of operation 305 may be an encryption key generated by the client device.

In operation 310, the encrypted first data item is included in a data object, such as data object 105 of FIG. 1 and/or data object 205 of FIG. 2. Accordingly, an example of operation 310 may be the inclusion of the encrypted data string in data portion 210b or 210c of data object 205 of FIG. 2.

In operation 315 a second encryption key is received at the client device from a key management device. Accordingly, an example of operation 315 may be the receipt of "KMSKey1" from KMS 135 at client device 130a as described with reference to FIG. 1 above. Accordingly, the second encryption key may be an external encryption key.

In operation 320 the first encryption key is encrypted using the second encryption key, and in operation 325, the encrypted first encryption key is included in the data object. An example of these two operations may be the creation of encrypted portion 120c of data object 105 as described above with reference to FIG. 1. Similarly, an example of these operations may be the creation of one or more of workgroup definitions 225a and/or 225c of FIG. 2. Upon completion of operation 325, a data object has been created that includes two stages of encryption: a first stage in which data to be stored in the data object is encrypted using the first encryption key, and a second stage in which the first encryption key is included or embedded in the data object and encrypted using a second encryption key.

One or more of the above-described operations may be repeated in order to created additional data portions using addition local and external encryption keys. For example, operations 305-325 may be repeated using the same or different encryption keys to generate data objects like data object 105 of FIG. 1 and/or data object 205 of FIG. 2 in which different levels of access to different portions of the data object are provided to different workgroups.

Finally, in operation 330, the data object is stored at a storage device. The storage device may be a cloud service provider storage device, such as storage device 140 of FIG. 1, a client-side storage device, and/or the client device itself.

Figure 4:
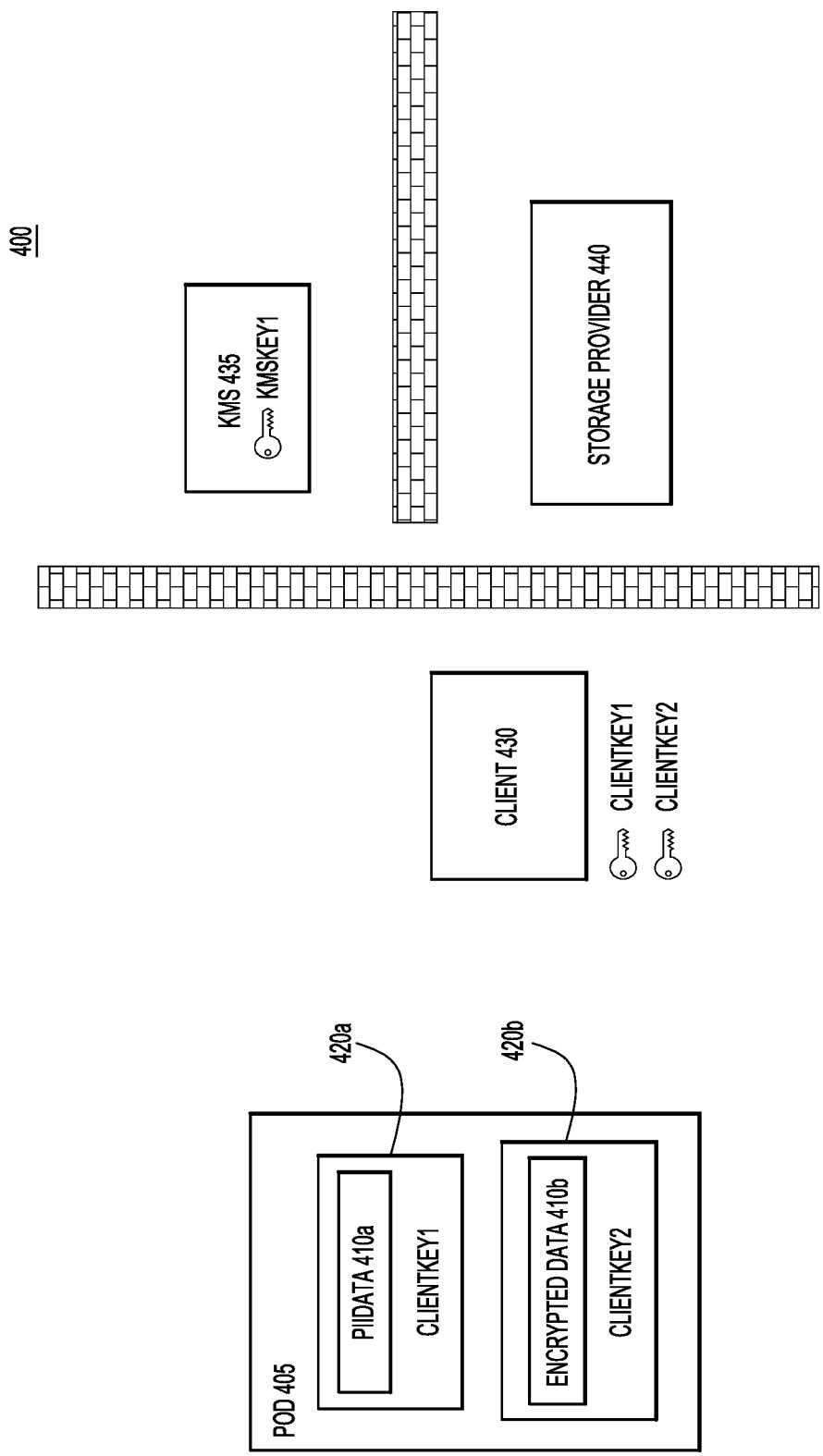
FIGS. 4-7 are a series of block diagrams of a network environment illustrating operations that generate a data object configured to provide multiple levels of group access to partial data objects, according to an example embodiment.

Turning now to FIGS. 4-7, depicted therein are a series of operations of a process 400 for the creation of a data object 405. Data objection 405 of FIG. 4, when initially generated will include two data portions and one work group definition with two embedded keys. As illustrated in FIG. 4, client 430 begins with two pieces of data, "PiiData" 410a and "EncryptedData" 410b. In other words, client 430 includes data that corresponds to data portions 210b and 210c of FIG. 2, respectively. Client 430 may also include plain text data that would correspond to plain text data 210a of FIG. 2, but because embedded and external keys are not used with plain text data, plain text data is not illustrated in FIG. 4. Client 430 generates client keys "ClientKey1" and "ClientKey2" for each of "PiiData" 410a and "EncryptedData" 410b, respectively, and uses these client keys to encrypt "PiiData" 410a and "EncryptedData" 410b through encryptions 420a and 420b.

Figure 5:
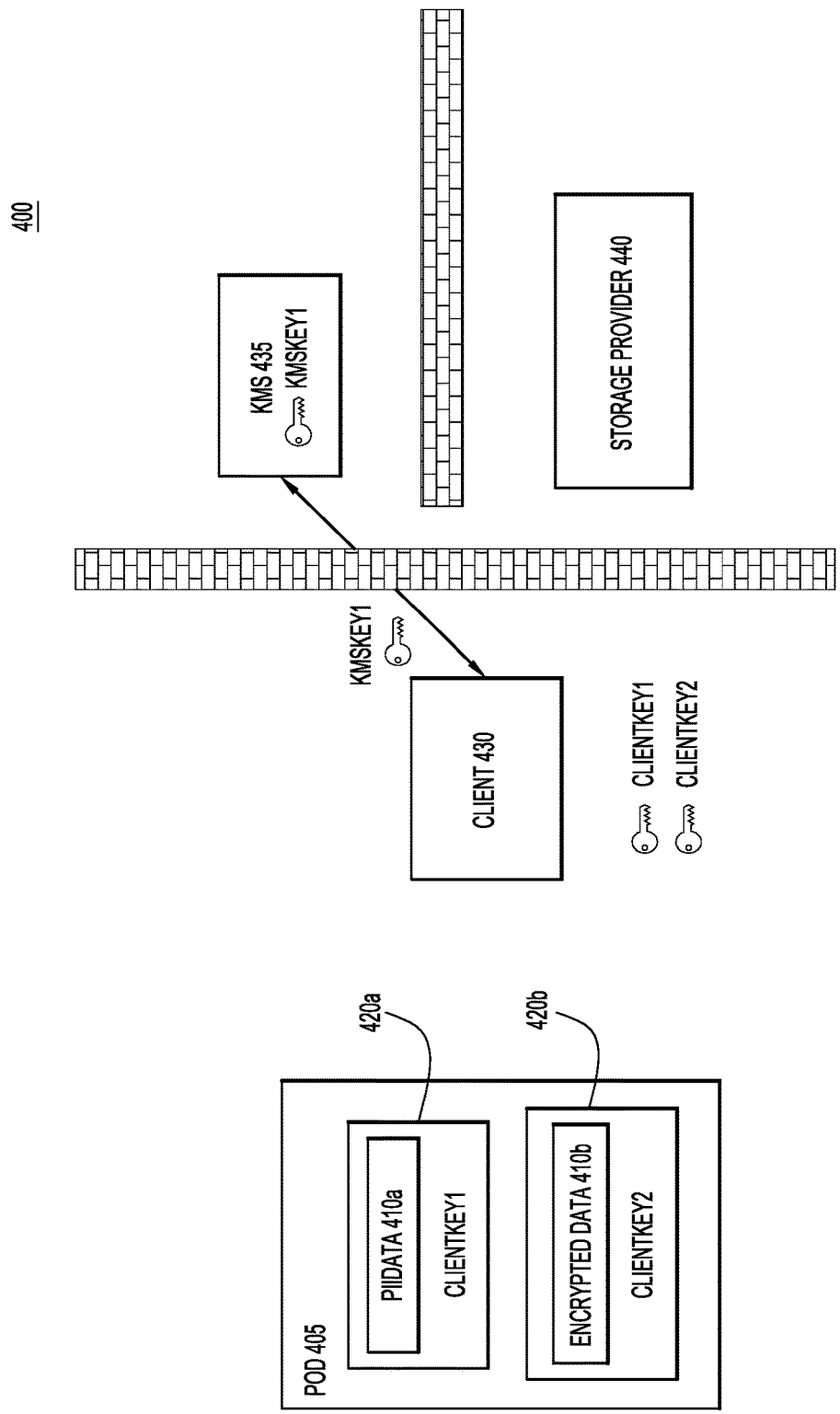
Figure 6:
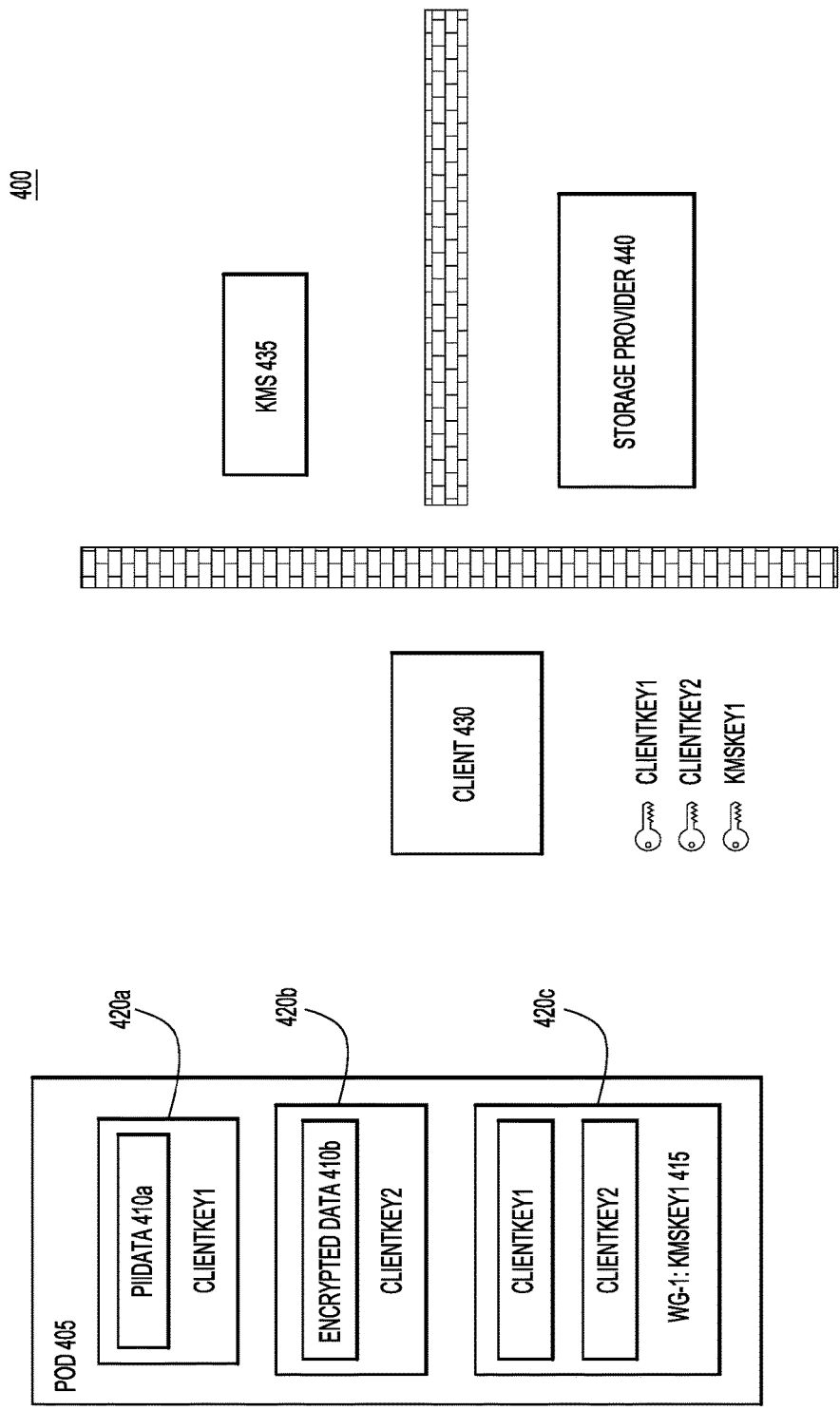
Figure 7:
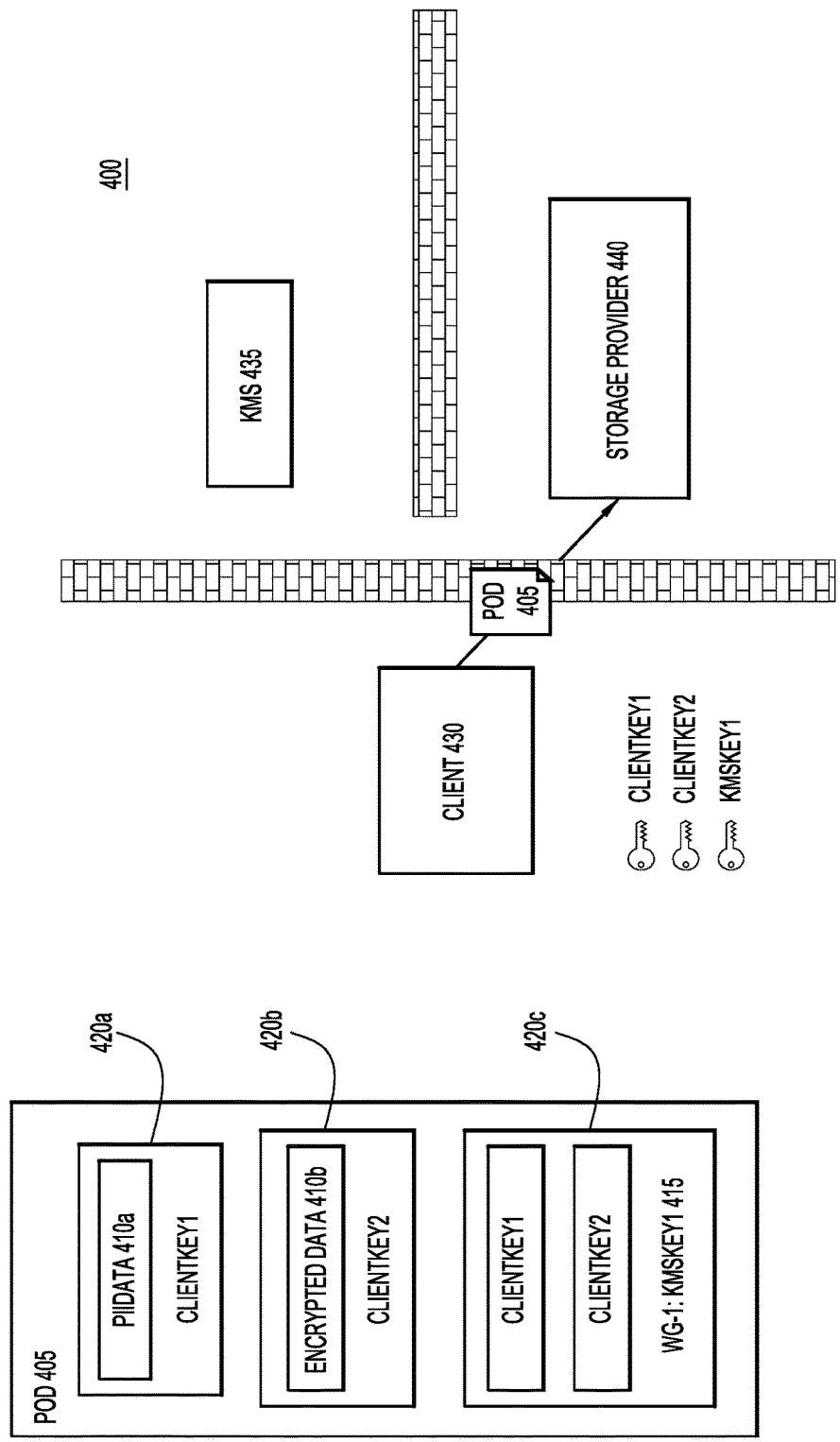

In FIG. 5, client 430 determines a workgroup that will have access to both "PiiData" 410a and "EncryptedData" 410b. Accordingly, when client 430 includes an encryption key portion in data object 405, both of "ClientKey1" and "ClientKey2" will need to be embedded in this client portion. In order to embed "ClientKey1" and "ClientKey2" in an encryption key portion for the determined workgroup, client 430 requests a first external key, "KMSKey1," from KMS 435. Client 430 then binds this external encryption key to the first work group, WG-1. Once bound to the first workgroup, client 430 uses "KMSKey1" to embed "ClientKey1" and "ClientKey2" in data object 405 via encryption key portion 415 that is encrypted through encryption portion 420c, as illustrated in FIG. 6. Encrypted portion 420c is encrypted using "KMSKey1." Therefore, as it stands in FIG. 6, data object 405 has two-stage encryption for the data that is accessible by the first workgroup. Specifically, each of the "PiiData" 410a and the "EncryptedData" 410b are encrypted using encryption keys embedded in data object 405, thereby forming the first stage of encryption. The embedded encryption keys "ClientKey1" and "ClientKey2" are themselves encrypted, this time with an external encryption key "KMSKey1," thereby forming the second stage of encryption. With the two stage encryption in place, the data object 405 may be stored. As illustrated in FIG. 7, the data object may be securely stored at a storage device 440 that may be associated with a third party storage provider and remain secure from the third party storage provider, as well as from KMS 435 and its related service provider.

Figure 9:
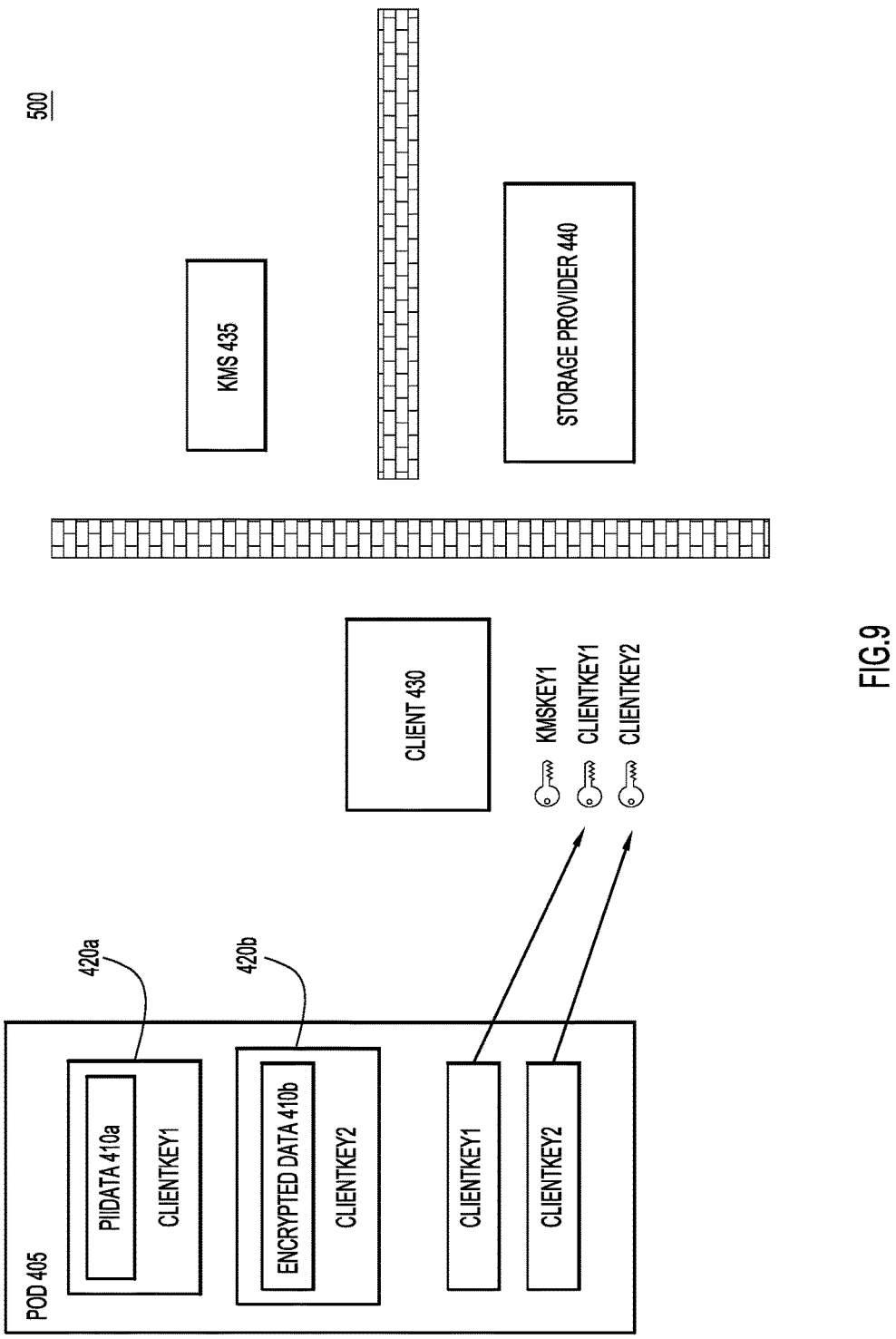
Figure 10:
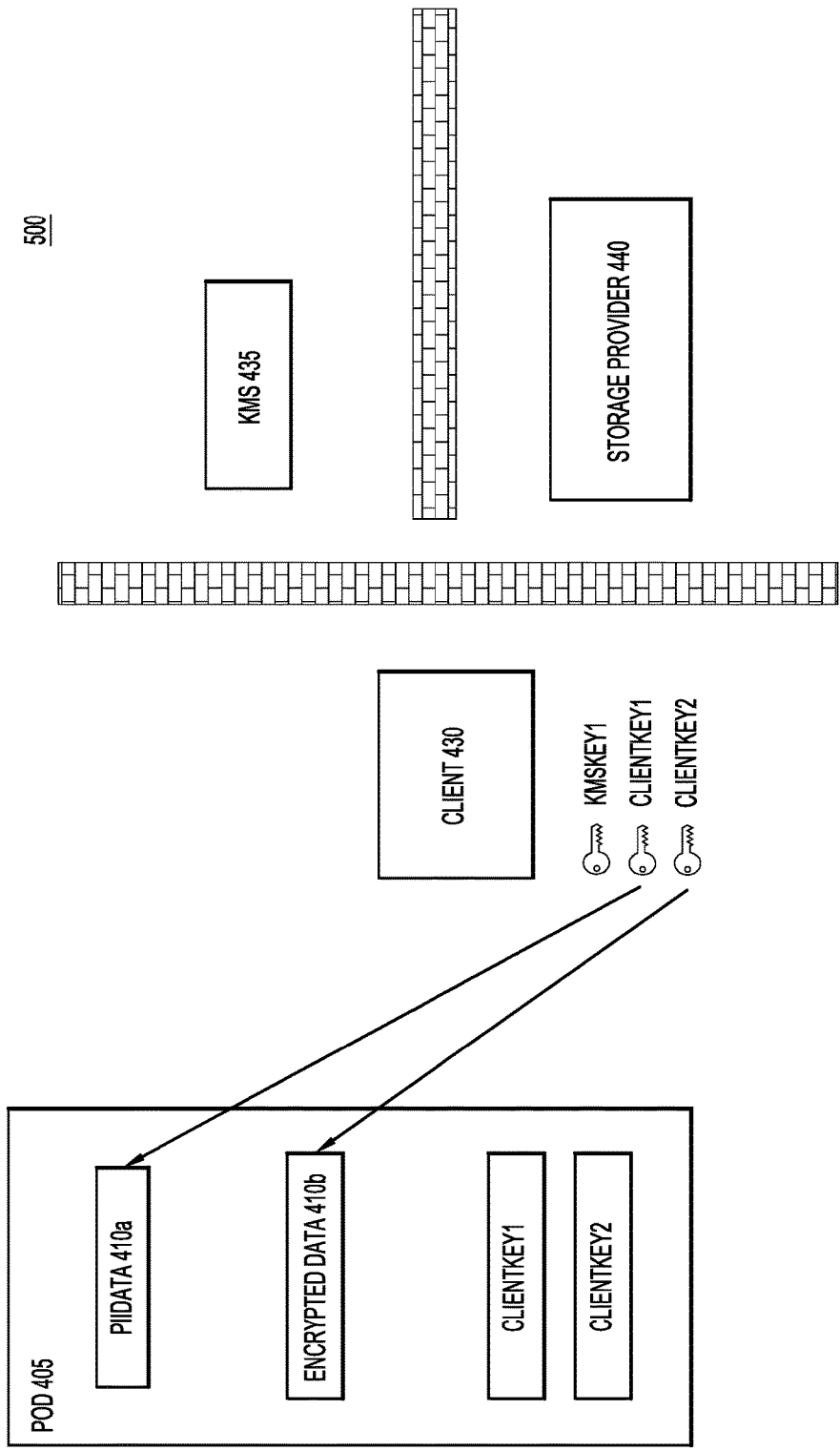

With reference now made to FIGS. 8-10, depicted therein are a series of operations of a process 500 that are used to access or read the data contained in data object 405. As illustrated in FIG. 8, the process for a client device accessing data object 405 begins with client device 430 requesting and receiving data object 405 from storage device 440. Because the contents of data object 405 are encrypted, data object 405 may be sent to client 430 without client 430 indicating membership in any particular workgroup, or providing storage device 440 with any indication of its level of access rights to data object 405. Furthermore, because the contents of data object 405 are encrypted, data object 405 may be transferred to client 430 over unsecured communication channels.

As also illustrated in FIG. 8, client 430 will also request from KMS 435 the external encryption key for the workgroup to which client 430 is a member. Assuming client 430a is a member of the first workgroup described above with reference to FIGS. 4-7, client 430 will receive "KMSKey1" from KMS 435. Upon receipt of "KMSKey1," client 430 is able to decrypt "ClientKey1" and "ClientKey2", as illustrated through FIG. 9. Finally, as illustrated in FIG. 10, client 430 may use "ClientKey1" and "ClientKey2" to decrypt "PIIData" 410a and "EncryptedData" 410b, respectively.

Accordingly, as illustrated through FIGS. 8-10, the use of the two-stage encryption described herein provides numerous benefits, including:
  End-to-end encryption;
  Secure storage of data objects with third party providers that are unaware of the workgroups associations upon which differing levels of security are provided;

the application of KMS security services to data stored at third party storage providers without requiring communication or interfacing between the KMS and the third party storage provider; and Application level encryption.

Figure 11:
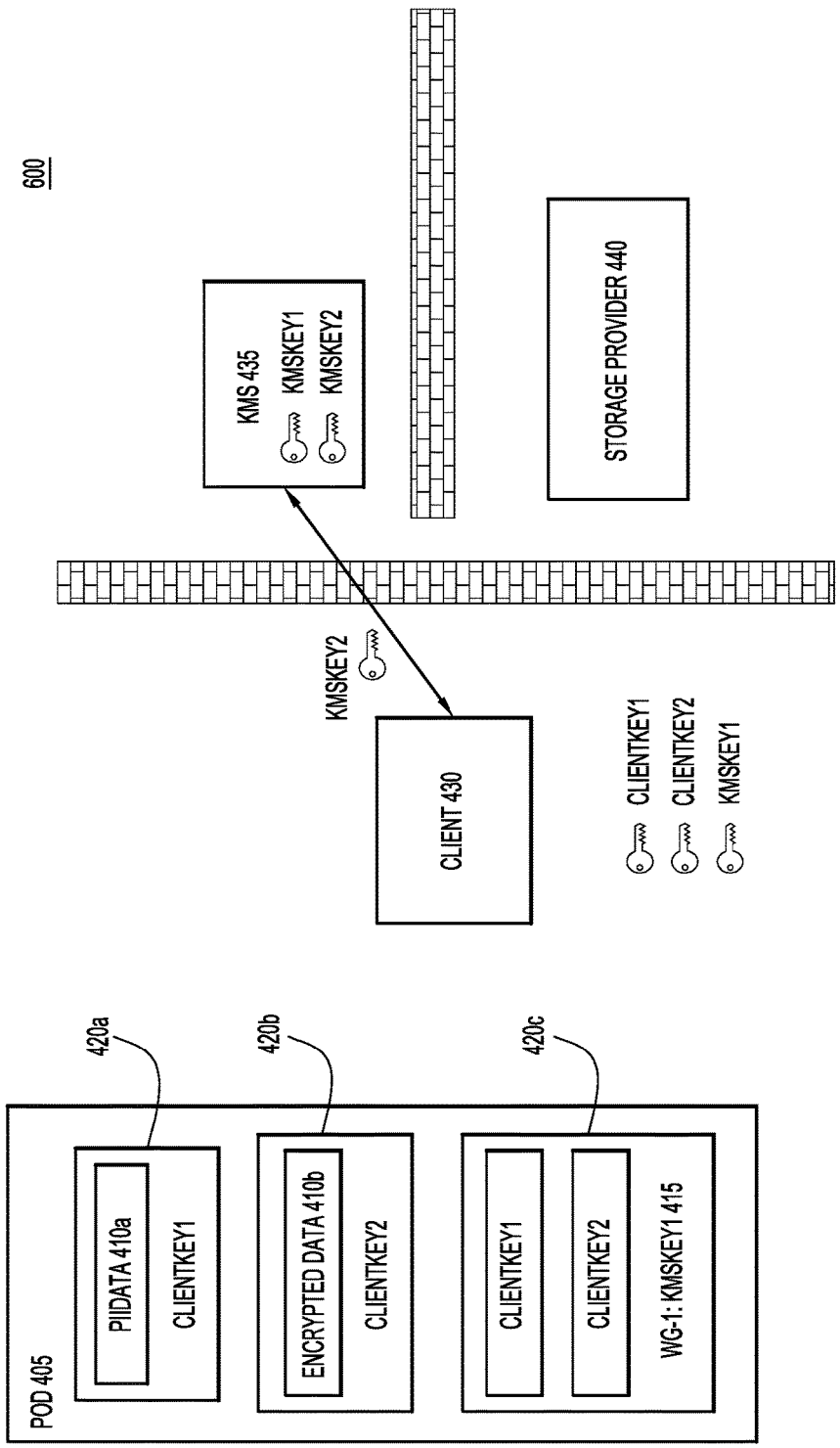
FIGS. 11 and 12 are block diagrams of a network environment illustrating operations that update the contents of a data object configured to provide multiple levels of group access to partial data objects, according to an example embodiment.
Figure 12:
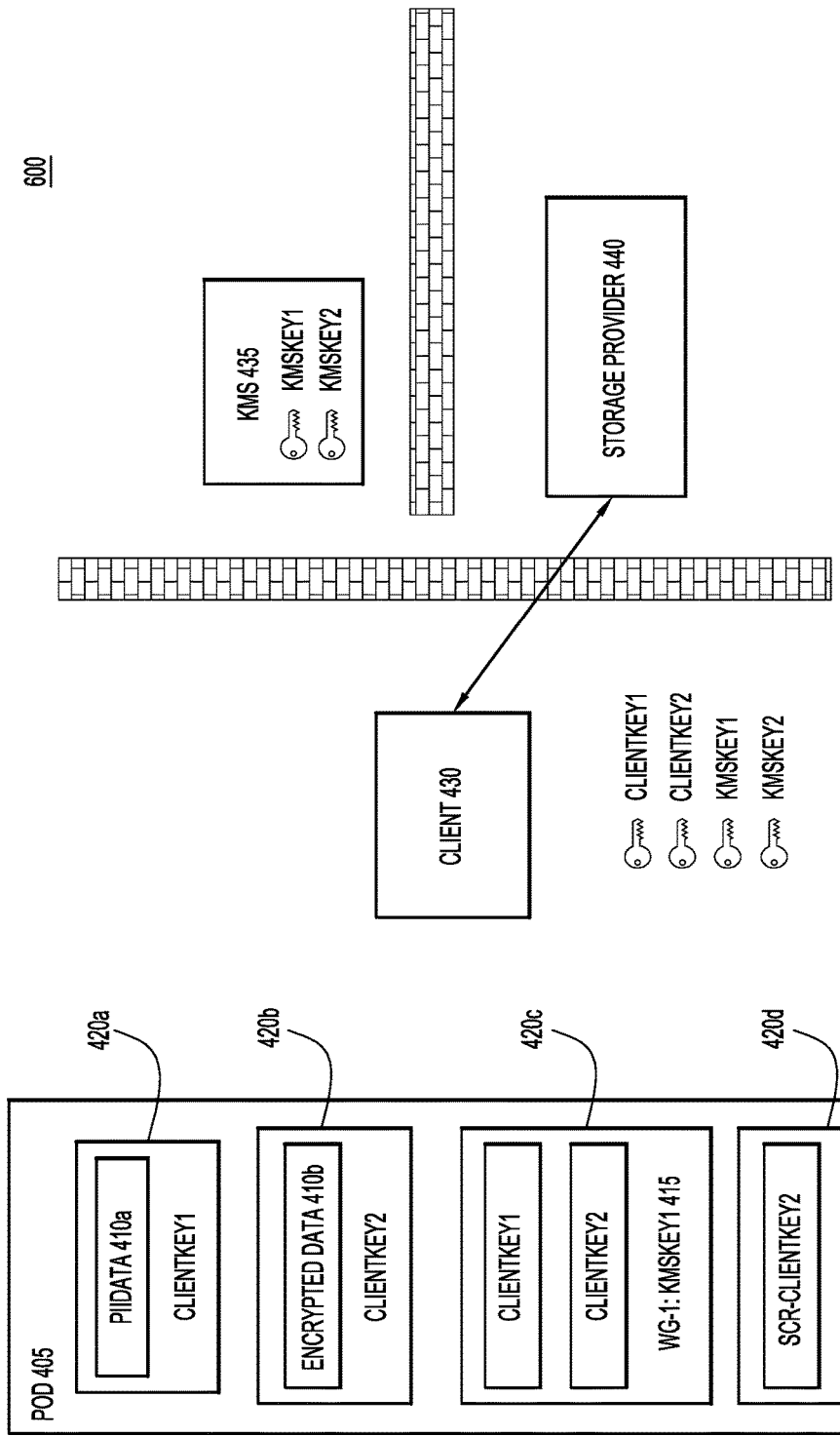

With reference now made to FIGS. 11 and 12, depicted therein are operations of a process 600 performed by a client device 430 to provide different levels of security to different portions of data object 405. The operations begin in FIG. 11 in which data object 405 is generated as illustrated in FIG. 7, or received from storage in FIG. 8. The operations of FIG. 11 begin with a determination at client device 430 that a second workgroup should have access to the encrypted data in data object 405. Specifically, client device 430 determines that a second workgroup should have access to "Encrypted-Data" 410b, but not to "PiiData" 410a. Therefore, client device 430 will modify data object 405 to include a second encryption key portion in addition to existing encryption key portion 415. Where encryption key portion 415 includes embedded keys that allow members of the first work group to access both "PIIData" 410a and "EncryptedData" 410b, the second encryption key portion will only contain "ClientKey2," thereby allowing the second work group to access "EncryptedData" 410b, but not "PiiData" 410a.

To generate the second encryption key portion, client device 430 requests the external key associated with the second work group from KMS 435. As illustrated in FIG. 11, this key is "KMSKey2." Accordingly, "KMSKey2" is transferred from KMS 435 to client device 430. As illustrated in FIG. 12, client device 430 uses "KMSKey2" to encrypt "ClientKey2" in encryption 420d, thereby forming a second encryption key portion 445. Finally, the updated data object is transferred to storage device 440. In other words, through second encryption key portion 445, data object 405 now includes an embedded key for a second workgroup that allows that second workgroup to access the contents of "EncryptedData" 410b. Therefore, when a device associated with the second workgroup accesses data object 405, the device will be able to access "KMSKey2" from KMS 435. The external key "KMSKey2" will be able to decrypt a first stage of encryption represented by encryption 420d to receive "ClientKey2." The client device will then be able to decrypt encryption 420b using "ClientKey2" to access "EncryptedData" 410b. On the other hand, because a device associated with the second workgroup will not be able to receive "KMSKey1" from KMS 435, such a device will not be able to decrypt "ClientKey1" contained in encryption portion 415, and therefore, will not be able to access "PIIData" 410a. In other words, through the techniques described herein, data objects may be constructed that permit multiple levels of group access to data objects using external keys (e.g., keys managed in stored at keys stores like KMS 435) and embedded keys to provide partial access to data contained in the data object.

With reference now made to FIGS. 13-16, depicted therein are additional operations that may be carried out between a client device and storage device, such as a device of a third party storage provider, that will allow client devices to search for data objects even though the data objects may be encrypted according to the two-stage encryption techniques described herein. Specifically, illustrated in FIGS. 13-16 are operations that allow the encrypted data to be indexed and searched in the storage device even though the storage device does not have the keys necessary to decrypt the data contained in the data objects.

Figure 13:
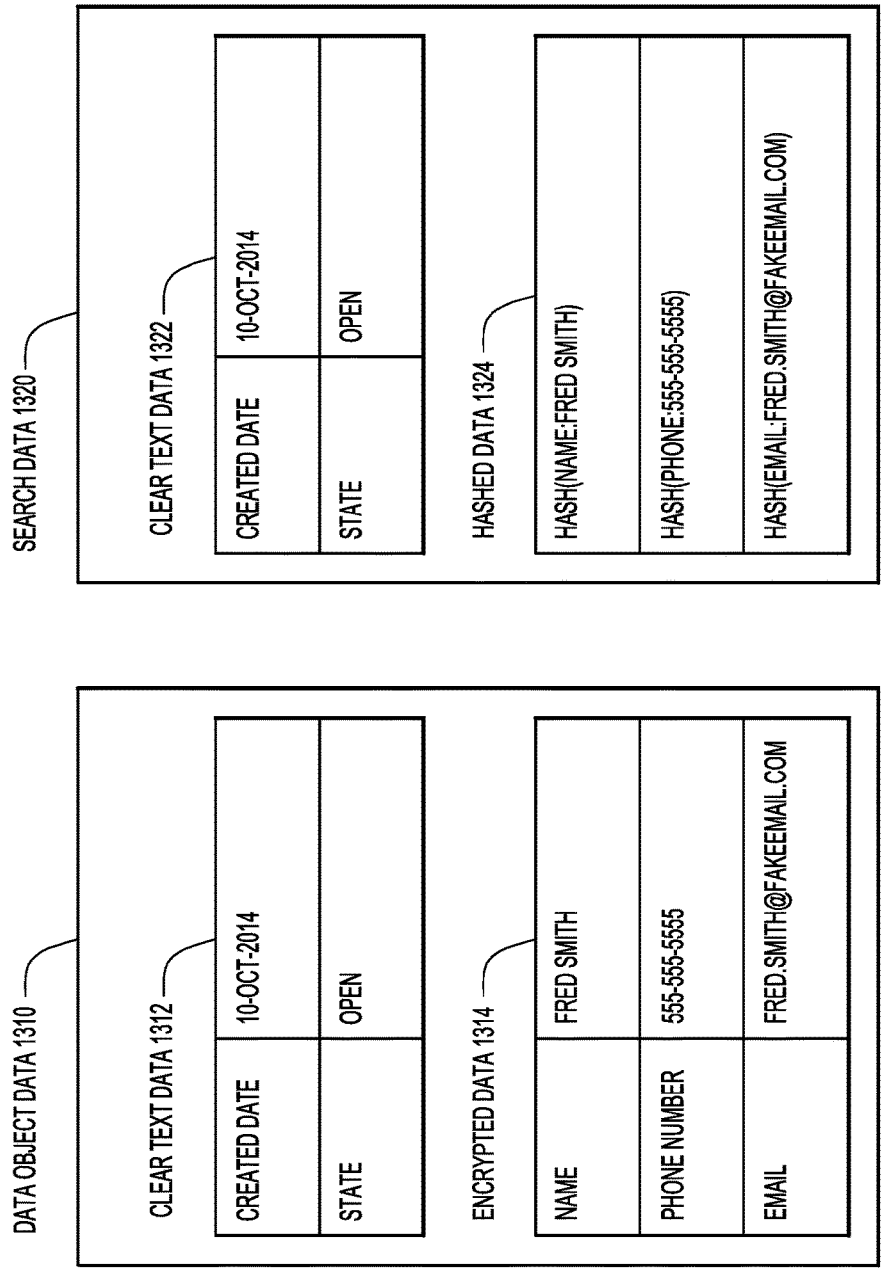
FIG. 13 is an illustration of hash values and corresponding data values that are used provide an indexing and searching functionality for data objects configured to provide multiple levels of group access to partial data objects, according to an example embodiment.

With reference made to FIG. 13, depicted therein are the data object data 1310 that is contained within a data object, and search data 1320 that may also be sent to a storage device, such as third party storage device 140 of FIG. 1. Specifically, the data object data includes plain text data 1312 and encrypted data 1314. The plain text data 1312 may be accessed, indexed and queried by a storage device, such as storage device 140 of FIG. 1, and therefore, the plain text search data 1322 is identical to the plain text data object data 1312. Encrypted data 1314, on the other hand, will be encrypted when received at the storage device as part of the data object. Furthermore, unencrypted data may not be sent to the storage device to allow searching as doing so would undermine the purpose of providing end-to-end encryption. Accordingly, search data 1320 includes hashed data 1324 that corresponds to the encrypted data 1314 that is included in the encrypted data object. As described below, this hashed data 1324 may be indexed and used by the storage device to allow searching and querying of the encrypted data object data.

Figure 14:
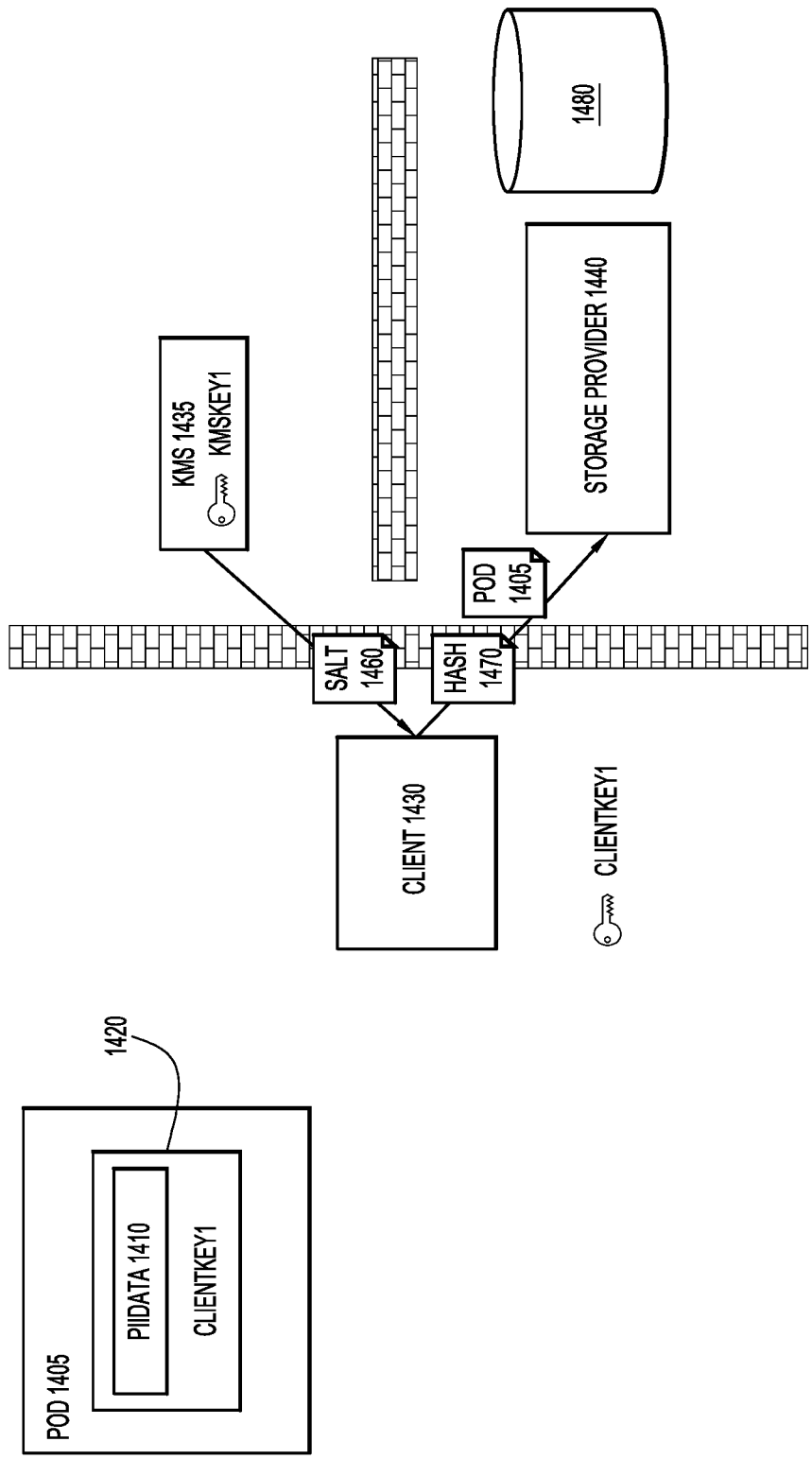
FIG. 14 is a block diagram of a network environment illustrating operations to provide a data storage device with hash values used to search encrypted data contained in data objects configured to provide multiple levels of group access to partial data objects, according to an example embodiment.

Specifically, at the time of creation of an encrypted data object (e.g., concurrent with the process steps illustrated in FIGS. 4 and/or 12), the client device creating the encrypted data object data may also receive a salt value from a KMS. Or, as illustrated in FIG. 14, as part of the process of generating encrypted data 1410, client 1430 may receive one or more salt values 1460 from KMS 1435. This salt value 1460 may be specific to the organization to which client device 1430 belongs. For example, salt value 1460 may be specific to a company associated with client device 1430. According to other examples, salt value 1460 may be workgroup specific.

Through the use of salt value 1460, client device 1430 computes a hash value over each plain text value that is included in encrypted data 1410. For example, the hash value associated with:
    "Fred Smith"
may be generated as:
    "b3507380819d21f14a4cc8fe20fd977d648ba5f08461d
    1c004d25881454479cd."
The hash values associated with:
    "555-555-5555"
may be generated as
    "6c22cdc4243014fd1d185eede08e9b483757af58655aa
    8dee9ade13797d53f40."
The hash value associated with
    fred.smith@fakeemail.com
may be generated as:
    "eyJ1bmMiOiJBMjU2R0NNIiwiYWxnIjoiZGlyIn0..
    loir3qtkv73chKF_mvoDx5."
Once generated, these hash values 1470 may be associated with the encrypted data sent to storage device 1440, allowing storage device 1440 to generate hash index 1480. As illustrated in FIG. 14, the hash values 1470 are sent separately from data object 1405, but other example embodiments may include the hash values as part of the data object. With reference now made to FIG. 0.15, depicted therein is an example data object 1505 similar in structure to data object 205 of FIG. 2. In addition to "PiiData" 1510, data object 1505 also includes "PiiHashes" 1560 which may be used by a storage device to create indexes that may be searched for values corresponding to encrypted "PiiData" 1510.

Figure 16:
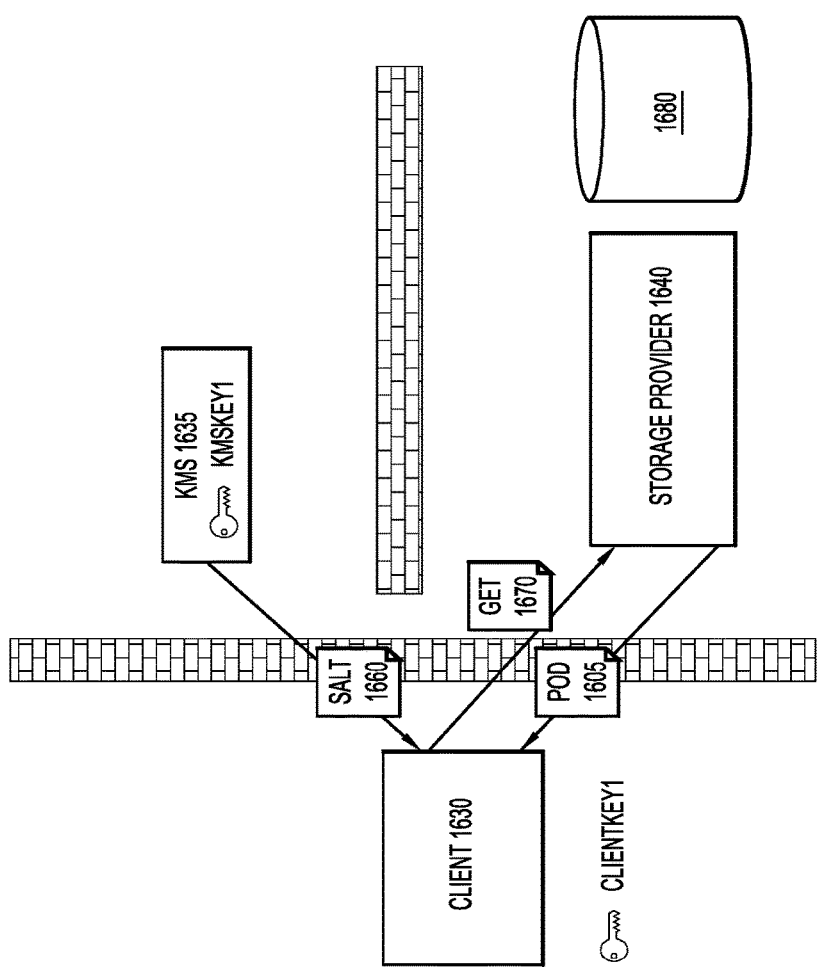
FIG. 16 is a block diagram of a network environment illustrating operations in which hash values are used to search a data storage device containing data objects configured to provide multiple levels of group access to partial data objects, according to an example embodiment.

With reference now made to FIG. 16, depicted therein are operations that may be performed to search for and retrieve encrypted data objects contained in storage device 1640. Specifically, if there is value that a client device 1630 intends to search for in encrypted data stored at storage device 1640, client device 1630 request and receives salt value 1660 from KMS 1635. Client device 1630 computes a hash value of over the plain text value that will be used to search storage device 1640 using salt value 1660 received from KMS 1635. This hash value is included in a "Get" request 1670 that is sent to storage device 1640. "Get" request 1670 may include multiple hash values corresponding to different data fields contained in an encrypted data object stored at storage device 1640. "Get" request 1670 may also include Boolean logic such as "AND" and/or "OR" operators to create more complex queries based upon hash values.

Once received at storage device 1640, "Get" request 1670 is executed against hash index 1680. If matching values from hash index 1680 are found, the corresponding encrypted data objects will be returned to client 1630.

With reference now made to FIG. 17, depicted therein is a flowchart 1700 illustrating a method for providing secure look-up of encrypted data using hashing and key stores. Specifically, flowchart 1700 illustrates a generalized process for the example embodiment illustrated through FIGS. 13-16.

Flowchart 1700 beings in operation 1705 where the data object is transmitted from the client device to the storage device for storage of the data object at the storage device. In operation 1710, a salt value is received at the client device from the key management device.

In operation 1715, the salt value is used by the client device to generate a hash value for a data item contained in the data object. When in the data object, the data item will be encrypted for transmission to and storage at the storage device. The hash value is generated at the client device based upon the unencrypted value of the data item.

Finally, in operation 1720, the hash value is transmitted from the client device to the storage device. Once received at the storage device, the hash value is included in an index sorted at the storage device. The hash value will be associated with the encrypted data item at the storage device. Accordingly, the index may be search using, for example, "GET" calls sent from client devices using hash values generated using the same salt value used in operation 1710 and 1715.

For completeness, it is noted that the operations included in flowchart 1700 may take place in a different order while remaining within the techniques described herein. For example, as described with reference to FIG. 14, the hash values and the data object may be transmitted to the storage device at the same time. Furthermore, the transmission of the hash values to the storage device may take place within the data object, as illustrated above through reference numeral 1560 of FIG. 15.

Accordingly, through the systems and operations illustrated through FIGS. 13-17, are processes through which hashes provide a repeatable, secure mechanism for the cloud to store and index the data and for the client to be able to lookup matching data without exposing the content of the data to the cloud data store. The security of this mechanism is increased by limiting access to the salt value used for the hashing only to those clients devices within the desired organization and/or within predetermined workgroups.

These techniques are simple to implement and require very little additional overhead. Furthermore, these techniques do not expose additional attack vectors that a two way hashing or alternate encryption scheme may include that would be required to compute indices in a known way to all client devices.

Figure 18:
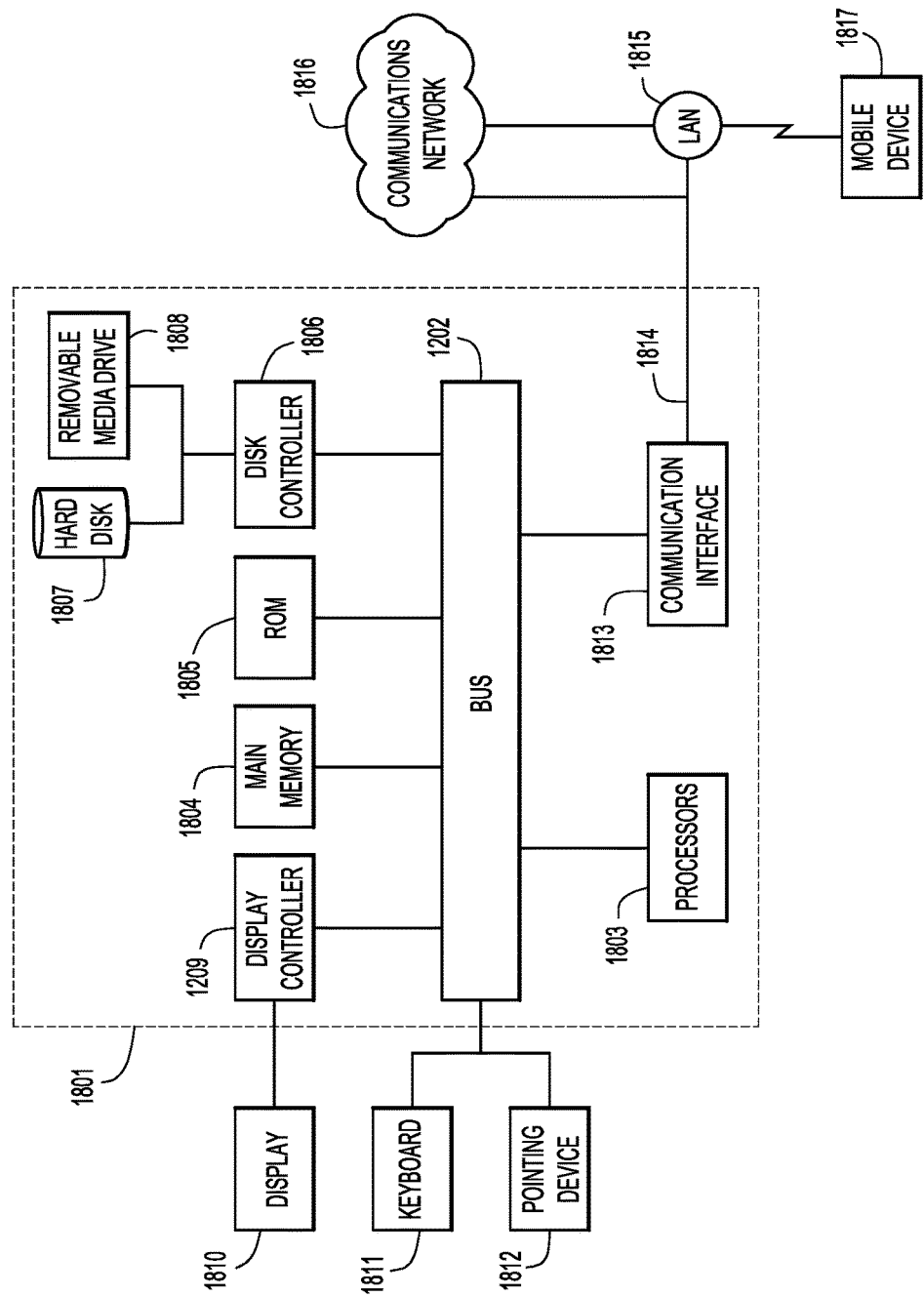
FIG. 18 is a block diagram of network device configured to provide multiple levels of group access to partial data objects, according to an example embodiment.

With reference now made to FIG. 18, illustrated therein is a computer system 1801 upon which the embodiments presented may be implemented. The computer system 1801 may be programmed to implement a computer based device, and may be, for example, such as for a client device described above. The computer system 1801 includes a bus 1802 or other communication mechanism for communicating information, and a processor 1803 coupled with the bus 1802 for processing the information. While the figure shows a signal block 1803 for a processor, it should be understood that the processors 1803 represent a plurality of processing cores, each of which can perform separate processing. The computer system 1801 also includes a main memory 1804, such as a random access memory (RAM) or other dynamic storage device (e.g., dynamic RAM (DRAM), static RAM (SRAM), and synchronous DRAM (SD RAM)), coupled to the bus 1802 for storing information and instructions to be executed by processor 1803. In addition, the main memory 1804 may be used for storing temporary variables or other intermediate information during the execution of instructions by the processor 1803.

The computer system 1801 further includes a read only memory (ROM) 1805 or other static storage device (e.g., programmable ROM (PROM), erasable PROM (EPROM), and electrically erasable PROM (EEPROM)) coupled to the bus 1802 for storing static information and instructions for the processor 1803.

The computer system 1801 also includes a disk controller 1806 coupled to the bus 1802 to control one or more storage devices for storing information and instructions, such as a magnetic hard disk 1807, and a removable media drive 1808 (e.g., floppy disk drive, read-only compact disc drive, read/write compact disc drive, compact disc jukebox, tape drive, and removable magneto-optical drive). The storage devices may be added to the computer system 1801 using an appropriate device interface (e.g., small computer system interface (SCSI), integrated device electronics (IDE), enhanced-IDE (E-IDE), direct memory access (DMA), or ultra-DMA).

The computer system 1801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1801 may also include a display controller 1809 coupled to the bus 1802 to control a display 1810, such as a cathode ray tube (CRT), liquid crystal display (LCD) or any other display technology now known or hereinafter developed, for displaying information to a computer user. The computer system 1801 includes input devices, such as a keyboard 1811 and a pointing device 1812, for interacting with a computer user and providing information to the processor 1803. The pointing device 1812, for example, may be a mouse, a trackball, or a pointing stick for communicating direction information and command selections to the processor 1803 and for controlling cursor movement on the display 1810. In addition, a printer may provide printed listings of data stored and/or generated by the computer system 1801.

The computer system 1801 performs a portion or all of the processing steps of the processes described herein in response to the processor 1803 executing one or more sequences of one or more instructions contained in a memory, such as the main memory 1804. Such instructions may be read into the main memory 1804 from another computer readable medium, such as a hard disk 1807 or a removable media drive 1808. One or more processors in a multi-processing arrangement may also be employed to execute the sequences of instructions contained in main memory 1804. In alternative embodiments, hard-wired circuitry may be used in place of or in combination with software instructions. Thus, embodiments are not limited to any specific combination of hardware circuitry and software.

As stated above, the computer system 1801 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1801, for driving a device or devices for implementing the process, and for enabling the computer system 1801 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1801 also includes a communication interface 1813 coupled to the bus 1802. The communication interface 1813 provides a two-way data communication coupling to a network link 1814 that is connected to, for example, a local area network (LAN) 1815, or to another communications network 1816 such as the Internet. For example, the communication interface 1813 may be a wired or wireless network interface card to attach to any packet switched (wired or wireless) LAN. As another example, the communication interface 1813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1813 sends and receives electrical, electromagnetic or optical signals that carry digital data streams representing various types of information.

The network link 1814 typically provides data communication through one or more networks to other data devices. For example, the network link 1814 may provide a connection to another computer through a local are network 1815 (e.g., a LAN) or through equipment operated by a service provider, which provides communication services through a communications network 1816. The local network 1814 and the communications network 1816 use, for example, electrical, electromagnetic, or optical signals that carry digital data streams, and the associated physical layer (e.g., CAT 5 cable, coaxial cable, optical fiber, etc.). The signals through the various networks and the signals on the network link 1814 and through the communication interface 1813, which carry the digital data to and from the computer system 1801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1801 can transmit and receive data, including program code, through the network(s) 1815 and 1816, the network link 1814 and the communication interface 1813. Moreover, the network link 1814 may provide a connection through a LAN 1815 to a mobile device 1817 such as a personal digital assistant (PDA) laptop computer, or cellular telephone.

In summary, according to one aspect, provided for herein are methods by which a first data item is encrypted at a client device using a first encryption key. The encrypted first data item is included in a data object. A second encryption key is received at the client device from a key management device. The first encryption key is encrypted using the second encryption key. The encrypted first encryption key is included in the data object, and the data object is stored at a storage device.

According to further aspects, the methods may also include encrypting a second data item at the client device using a third encryption key. The second data item may also be included in the same data object as the first data item. The third encryption key is encrypted using a fourth encryption key. The encrypted third encryption key is included in the data object.

Also provided for herein is an apparatus comprising one or more network interfaces configured to communicate over a network, and one or more processors. The processors are configured to encrypt a first data item using a first encryption key. The processor is further configured to include the encrypted first data item in a data object. The processor is further configured to receive, via the network interface unit, a second encryption key from a key management device. The processor encrypts first encryption key using the second encryption key. The processor includes the encrypted first encryption key in the data object. The processor stores the data object at a storage device.

According to further aspects, the processor may be further configured to encrypt a second data item using a third encryption key. The processor may include the second data item in the same data object as the first data item. The processor encrypts the third encryption key using a fourth encryption key. The processor includes the encrypted third encryption key in the data object.

Additional aspects of the techniques provided for herein include one or more non-transitory computer readable storage media that are encoded with software comprising computer executable instructions. The instructions, when executed, are operable to encrypt, at a client device, a first data item using a first encryption key. The instructions are further operable to include the encrypted first data item in a data object. Upon execution, the instructions are further operable to receive, at the client device, a second encryption key from a key management device. The instructions are operable to encrypt the first encryption key using the second encryption key. Upon execution, the instructions include the encrypted first encryption key in the data object. The instructions are further operable to store the data object at a storage device.

According to additional aspects, the instructions may be further operable to encrypt a second data item using a third encryption key. Execution of the instructions is operable to include the second data item in the same data object as the first data item. The execution of the instructions encrypts the third encryption key using a fourth encryption key. The instructions, upon execution, are operable to include the encrypted third encryption key in the data object.

According to still other aspects, techniques are presented herein that utilize embedded and external keys (such as cloud-stored keys managed by a KMS) to provide selective workgroup level access to data in a record in an end-to-end encrypted format. This provides workgroup level access control and multiple level access control across the system. Some data storage systems today provide direct user access to data (by associating users with the conversations and content directly). By utilizing SCRs and embedding them directly in the object along with the data for the keys, this provides an entirely new set of applications that can be accessed.

In accordance with yet another aspect, a method is provided comprising: requesting, at a client device, a data object from a data storage device; requesting, at the client device, a first encryption key from a key management device; decrypting a second encryption key included in the data object using the first encryption key; generating a decrypted first data item by decrypting an encrypted first data item stored in the data object using the second encryption key; and accessing the decrypted first data item. This method may also be embodied in an apparatus that includes at least one network interface and a processor coupled to the network interface, which processor is configured to perform these operations, and in instructions encoded or stored in a non-transitory computer readable storage media, which instructions, when executed be a processor, cause the processor to perform these operations.

In accordance with another aspect, in systems where client side encryption with key rotation is required and the cloud environment does not have the ability to index the raw data, a mechanism to perform search/lookup is often required. Utilization of client computed one-way hashes provides a repeatable, secure mechanism for the cloud to store and index the data and for the client to be able to lookup matching data without exposing the content of the data to the cloud data store. The security of this mechanism is increased by limiting access to the salt value used for the hashing only to those clients within the desired organization. This approach is simple to implement and has very little overhead to add into a system that already performs client side encryption and integrates with a key management store. Furthermore, it does not expose additional attack vectors that a two way hashing or alternate encryption scheme may include that would be required to compute indices in a known way to all clients.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
   encrypting, at a client device, a first data portion using a first encryption key for inclusion in a data object;
   including the encrypted first data portion in the data object;
   receiving, at the client device, a second encryption key from a key management device;
   encrypting the first encryption key with the second encryption key;
   including the encrypted first encryption key in the data object;
   encrypting, at the client device, a second data portion using a third encryption key;
   including the encrypted second data portion in the data object;
   receiving, at the client device, a fourth encryption key from the key management device;
   encrypting the third encryption key using the fourth encryption key;
   including the encrypted third encryption key in the data object; and
   storing the data object at a storage device.
2. The method of claim 1, further comprising:
   assigning a first user group to access the first data portion using the second encryption key from the key management device;
   assigning a second user group to access the second data portion using the fourth encryption key from the key management device,
   wherein:
   receiving the second encryption key from the key management device comprises requesting the second encryption key from the key management device in response to determining the first user group; and
   receiving the fourth encryption key from the key management device comprises requesting the fourth encryption key from the key management device in response to determining the second user group.
3. The method of claim 1, further comprising:
   generating the first encryption key at the client device; and
   generating the third encryption key at the client device.
4. The method of claim 1, further comprising:
   retrieving the data object stored at the storage device;
   requesting the second encryption key from the key management device;
   decrypting the first encryption key included in the data object using the second encryption key;
   decrypting the first data portion included in the data object using the first encryption key;
   generating an updated first data portion by modifying the decrypted first data portion;
   encrypting the updated first data portion with the first encryption key; and
   replacing the encrypted first data portion in the data object with the encrypted updated first data portion.
5. The method of claim 1, wherein storing the data object comprises transmitting the data object from the client device to the storage device for storage at the storage device, the method further comprising:
   receiving, at the client device, a salt value from the key management device;
   generating, using the salt value, a hash value for the unencrypted first data portion; and
   transmitting the hash value to the storage device to be included in an index stored at the storage device, wherein the hash value will be included as an index value associated with the encrypted first data portion at the storage device.

6. The method of claim 5, wherein transmitting the hash value to the storage device comprises transmitting the hash value within the data object, and transmitting the data object from the client device to the storage device for storage at the storage device.

7. The method of claim 5, further comprising querying the storage device to search encrypted data stored at the storage device, wherein the querying comprises:
receiving the salt value at the client device from the key management device;
generating a query value using the salt value and a value to be search for in the encrypted data stored at the storage device;
transmitting the query value to be compared to values in the index; and
receiving query results from the storage device.

8. The method of claim 1, further comprising:
generating plain text data; and
including the plain text data in the data object without encryption.

9. A method comprising:
requesting, at a client device, a data object from a data storage device, the data object comprising a first data portion provided with encryption by a first encryption key, the first encryption key provided with encryption by a second encryption key, a second data portion provided with encryption by a third encryption key, and the third encryption key provided with encryption by a fourth encryption key;
requesting, at the client device, the second encryption key from a key management device;
decrypting the first encryption key using the second encryption key;
decrypting the first data portion using the second encryption key; and
accessing the first data portion.

10. The method of claim 9, further comprising:
generating a modified first data portion by modifying the first data portion;
generating an encrypted modified first data portion by encrypting the modified first data portion using the first encryption key; and
replacing the first data portion in the data object with the encrypted modified first data portion.

11. The method of claim 9, further comprising:
requesting, at the client device, the fourth encryption key from the key management device;
decrypting the third encryption key using the fourth encryption key;
decrypting the second data portion using the third encryption key; and
accessing the second data portion.

12. The method of claim 9, further comprising accessing a plain text portion of the data object.

13. The method of claim 9, wherein requesting the data object from the data storage device comprises:
receiving a salt value from the key management device;
generating a query value from the salt value; and
sending the query value to the data storage device.

14. An apparatus comprising:
a network interface configured to communicate over a network; and
a hardware processor coupled to the network interface configured to:
encrypt a first data portion using a first encryption key for inclusion in a data object;
include the encrypted first data portion in the data object;
receive, via the network interface unit, a second encryption key from a key management device;
encrypt the first encryption key with the second encryption key;
include the encrypted first encryption key in the data object;
encrypt a second data portion using a third encryption key;
include the encrypted second data portion in the data object;
receive, via the network interface unit, a fourth encryption key from the key management device;
encrypt the third encryption key using the fourth encryption key;
include the encrypted third encryption key in the data object; and
store the data object at a storage device.

15. The apparatus claim 14, wherein the processor is further configured to:
assign a first user group to access the first data portion using the second encryption key from the key management device;
assign a second user group to access the second data portion using the fourth encryption key from the key management device,
wherein:
the processor is configured to receive the second encryption key from the key management device by requesting the second encryption key from the key management device in response to determining the first user group; and
the processor is configured to receive the fourth encryption key from the key management device by requesting the fourth encryption key from the key management device in response to determining the second user group.

16. The apparatus claim 14, wherein the processor is further configured to:
generate the first encryption key at the client device; and
generate the third encryption key at the client device.

17. The apparatus claim 14, wherein the processor is further configured to:
retrieve the data object stored at the storage device;
request the second encryption key from the key management device;
decrypt the first encryption key included in the data object using the second encryption key;
decrypt the first data portion included in the data object using the first encryption key;
generate an updated first data portion by modifying the decrypted first data portion;
encrypt the updated first data portion with the first encryption key; and
replace the encrypted first data portion in the data object with the encrypted updated first data portion.

18. The apparatus of claim 14, wherein the processor is further configured to:
store the data object by transmitting the data object to the storage device for storage at the storage device via the network interface unit, the method further comprising:
receive, via the network interface unit, a salt value from the key management device;

generate, using the salt value, a hash value for the unencrypted first data portion; and transmit, via the network interface unit, the hash value to the storage device to be included in an index stored at the storage device, wherein the hash value will be included as an index value associated with the encrypted first data portion at the storage device.

19. The apparatus of claim 18, wherein the processor is configured to transmit the hash value to the storage device by transmitting the hash values within the data object, and transmitting the data object to the storage device for storage at the storage device.

20. The apparatus claim 14, wherein the processor is further configured to:

generate plain text data; and include the plain text data in the data object without encryption.

\* \* \* \* \*